US010709146B2

(12) United States Patent
Mikkelsen et al.

(10) Patent No.: US 10,709,146 B2
(45) Date of Patent: *Jul. 14, 2020

(54) CMP-CONTAINING, HIGH PROTEIN DENATURED WHEY PROTEIN COMPOSITIONS, PRODUCTS CONTAINING THEM, AND USES THEREOF

(71) Applicant: ARLA FOODS AMBA, Viby J (DK)

(72) Inventors: Bente Østergaard Mikkelsen, Viby J (DK); Hans Bertelsen, Videbæk (DK); Thea Fihl, Viby J (DK); Torben Jensen, Viby J (DK); Henrik Pedersen, Viby J (DK); Ulrik Toft Hansen, Viby J (DK)

(73) Assignee: ARLA FOODS AMBA, Viby J (DK)

( * ) Notice: Subject to any disclaimer, the term of this patent is extended or adjusted under 35 U.S.C. 154(b) by 462 days.

This patent is subject to a terminal disclaimer.

(21) Appl. No.: 15/030,810

(22) PCT Filed: Oct. 23, 2014

(86) PCT No.: PCT/EP2014/072788
§ 371 (c)(1),
(2) Date: Apr. 20, 2016

(87) PCT Pub. No.: WO2015/059243
PCT Pub. Date: Apr. 30, 2015

(65) Prior Publication Data
US 2016/0255848 A1 Sep. 8, 2016

(30) Foreign Application Priority Data
Oct. 23, 2013 (DK) .................. 2013 70614

(51) Int. Cl.
*A23C 9/13* (2006.01)
*A23C 21/06* (2006.01)
*A23J 1/20* (2006.01)
*A23L 33/19* (2016.01)

(52) U.S. Cl.
CPC ............ *A23C 9/1307* (2013.01); *A23C 21/06* (2013.01); *A23J 1/20* (2013.01); *A23J 1/205* (2013.01); *A23L 33/19* (2016.08); *A23V 2002/00* (2013.01)

(58) Field of Classification Search
CPC ....... A23C 9/1307; A23C 21/06; A23L 33/19; A23J 1/20; A23J 1/205
USPC ........................................... 426/657
See application file for complete search history.

(56) References Cited

U.S. PATENT DOCUMENTS

| | | | |
|---|---|---|---|
| 4,734,287 A * | 3/1988 | Singer | A23J 3/08 426/41 |
| 5,096,731 A | 3/1992 | Singer et al. | |
| 5,350,590 A | 9/1994 | McCarthy et al. | |
| 5,968,586 A * | 10/1999 | Etzel | A23J 1/205 426/271 |
| 6,106,874 A | 8/2000 | Liebrecht et al. | |
| 6,605,311 B2 * | 8/2003 | Villagran | A23F 3/163 426/590 |
| 6,767,575 B1 | 7/2004 | Huss et al. | |
| 2002/0039617 A1 | 4/2002 | Villagran et al. | |
| 2003/0194468 A1 * | 10/2003 | Konkoly | A23C 9/13 426/34 |
| 2004/0156979 A1 | 8/2004 | Villagran et al. | |
| 2006/0292275 A1 | 12/2006 | Akashe | |
| 2008/0317910 A1 | 12/2008 | Vaslin et al. | |
| 2010/0136203 A1 | 6/2010 | Sakata et al. | |
| 2011/0003975 A1 | 6/2011 | Arase et al. | |
| 2012/0114795 A1 | 5/2012 | Havea et al. | |
| 2012/0121776 A1 | 5/2012 | Arnaudov et al. | |
| 2013/0251884 A1 | 9/2013 | Langrish | |

FOREIGN PATENT DOCUMENTS

| | | |
|---|---|---|
| AU | 2013101214 | 10/2013 |
| CN | 101347155 | 1/2009 |
| DE | 4305874 | 9/1994 |
| DE | 102006053017 | 5/2008 |
| DE | 102012216990 | 3/2013 |
| EP | 0250623 A1 | 1/1988 |
| EP | 1042960 A2 | 10/2000 |
| EP | 1166655 | 1/2002 |
| EP | 1527690 | 5/2005 |
| EP | 2250906 | 11/2010 |
| JP | 2004357582 | 12/2004 |
| WO | WO 88/05771 | 8/1988 |
| WO | WO 93/25083 | 12/1993 |
| WO | WO 97/46111 | 12/1997 |
| WO | WO 2001/097629 | 12/2001 |

(Continued)

OTHER PUBLICATIONS

Heino, Antti T. et al., "Functional properties of native and cheese whey protein concentrate powders," International Journal of Dairy Technology, vol. 60, No. 4, Nov. 2007, pp. 277-285.
International Search Report for International Application No. PCT/EP2014/072788, dated Feb. 10, 2015, 3 pages.
Written Opinion of the International Searching Authority for International Application No. PCT/EP2014/072788, dated Feb. 10, 2015, 5 pages.
International Preliminary Report on Patentability for International Application No. PCT/EP2014/072788, dated Dec. 7, 2015, 7 pages.
Martinez; et al., "The dynamics of heat gelation of casein glycomacropeptide—β-lactoglobulin mixtures as affected by interactions in the aqueous phase." Int Dairy Journal, Sep. 2010, 20(9):580-588.

(Continued)

*Primary Examiner* — Jeffrey P Mornhinweg
(74) *Attorney, Agent, or Firm* — Casimir Jones, S.C.; Lisa V. Mueller

(57) ABSTRACT

The present invention pertains to a new type of CMP-containing, high protein denatured whey protein compositions and to a method of producing them. The invention furthermore pertains to products containing the high protein denatured whey protein compositions, particularly high protein, acidified dairy products, and additional uses of the denatured whey protein compositions.

22 Claims, 2 Drawing Sheets

(56) References Cited

FOREIGN PATENT DOCUMENTS

| WO | WO 02/30210 | 4/2002 |
|---|---|---|
| WO | 0245522 A1 | 6/2002 |
| WO | WO 2005/102075 A1 | 11/2005 |
| WO | WO 2006/058538 | 6/2006 |
| WO | WO 2006/068521 | 6/2006 |
| WO | WO 2007/027213 | 3/2007 |
| WO | WO 2008/063115 A1 | 5/2008 |
| WO | WO 2008/092458 | 8/2008 |
| WO | WO 2009/112036 | 9/2009 |
| WO | WO 2010/043415 | 4/2010 |
| WO | WO 2010/120199 | 10/2010 |
| WO | WO 2010/144821 | 12/2010 |
| WO | WO 2012/050434 | 4/2012 |
| WO | WO 2013/065014 | 5/2013 |
| WO | WO 2013/117599 A2 | 8/2013 |
| WO | WO 2015/059246 | 4/2015 |
| WO | WO 2015/059248 | 4/2015 |

OTHER PUBLICATIONS

Nautiyal, "Effect of Galactomannans and Low Esterified Pectin Combinations on Fruit Preparation Synersis, Rheology and Stability on Storage," International Journal of Food Science and Nutrition Engineering 2012, 2(2): pp. 6-11.
Anonymous: "Nutrition Facts and Analysis for Orange juice, raw", Sep. 17, 2013, Retrieved from the Internet: URL: http://web.archive.org/Web/20130917095347/http://nutritiondata.self.com/facts/fruits-and-fruit-juices/1971/2.
Anonymus: "pH Values of Common Foods and Ingredients", Jan. 1, 1995, pp. 1-2.
International Search Report and Written Opinion for Application No. PCT/EP2014/072793 dated Dec. 12, 2014 (10 pages).
International Preliminary Report on Patentability for Application No. PCT/EP2014/072793 dated Feb. 26, 2016 (8 pages).
International Search Report and Written Opinion for Application No. PCT/EP2014/072791 dated Mar. 24, 2015 (15 pages).
International Preliminary Report on Patentability for Application No. PCT/EP2014/072791 dated Mar. 24, 2016 (7 pages).
Product Data Sheet Simplesse 100 Whey Protein, Oct. 22, 2003, 3 pages.
Agave Juice, Wikipedia, 3 pages.
AVP LeanCreme, Microparticulation of Whey Protein with SPX Flow Technology, Dated Apr. 11, 2012, 28 pages.
Boland, "Whey Proteins." Handbook of Food Proteins, Chapter 3, Published 2011, 26 pages.
Declaration of Dr. Esra Cakir-Fuller, Mar. 13, 2019, 15 pages.
Dissertation of Marko Outlinen, "Effect of Pre-Treatment of Cheese Milk on the Composition and Characteristics of Whey and Whey Products." 2010, 86 pages.
Etzel, "Fractinating valuable peptides from whey." Dairy Pipeline, Wisconsin Center for Dairy Research, Dec. 2000, vol. 12, No. 4, 1 page.
Highly Profitable whey—LeanCreme process from SPX helps MS Iceland Dairies put excess when to best use. European Dairy Magazine 2012, 1 page.
Jingbo Xu "Impact of Casein Glycomacropeptide on Functional Properties of Whey Proteins" China excellent master's thesis full-text database, No. 6, 2009, pp. 53-61, Dec. 2009.
Koffi et al., "Storage stability and sensory analysis of UHT-processed whey-banana beverages." Journal of Food Quality, 2005,28(4): 386-401.
O'Loughlin et al., "Enzymatic Hydrolysis of Heat-induced Aggregates of Whey Protein Isolate." Teagase, 2012, 39 pages.
Matur, Oct. 2011.
Notice of Opposition filed against European Appl. No. 14789552.8 on Jan. 11, 2019, 22 pages.
Notice of Opposition filed Mar. 7, 2019 against European Application No. 14789259.0, by N.V. Nutricia, 28 pages.
Notice of Opposition filed Mar. 13, 2019 against European Application No. 14789259.0, by Fonterra Co-Operative Group Limited, 28 pages.
Sharma et al., "Development of a protein fortified fruit beverage and its quality when processed with pulsed electric field treatment." J. Food Quality 2007, 21(6): 459-564.
Simplesse, Mircoparticulated Whey Protein Concentrate, CP Kelco (2010), p. 4.
Souci, Fackmann, Kraut, Food Composition and Nutrition Tables (7th Revised and Completed edition, 2008), Banana, p. 1106.
Souci, Fackmann, Kraut, Food Composition and Nutrition Tables (7th Revised and Completed edition, 2008), Orange Juice Concentrate, p. 1204.
Souci, Fackmann, Kraut, Food Composition and Nutrition Tables (7th Revised and Completed edition, 2008), Orange Juice, p. 1200.
Souci, Fackmann, Kraut, Food Composition and Nutrition Tables (7th Revised and Completed edition, 2008), Potato Starch, p. 737.
Souci, Fackmann, Kraut, Food Composition and Nutrition Tables (7th Revised and Completed edition, 2008), Tapioca Starch, p. 740.
Spiegel, "Whey protein aggregation under shear conditions—effects of lactose and heating temperature on aggregate size and structure." International Journal of Food Science and Technology 1999, 34: 523-531.
Ye et al., "Characterization of cold-set gels produced from heated emulsions stabilized by whey protein" International Dairy Journal, 2009, 19:721-727.
Xu, "Impact of Casein Glycomacropeptide on Functional Properties of Whey Proteins" China excellent master's thesis full-text database, Dec. 2009, Chapter 2, 14 pages.
Office Action dated Dec. 16, 2019, in Indian Application No. 201617016324, 6 pages.

\* cited by examiner

CMP-CONTAINING, HIGH PROTEIN DENATURED WHEY PROTEIN COMPOSITIONS, PRODUCTS CONTAINING THEM, AND USES THEREOF

CROSS-REFERENCE TO RELATED APPLICATIONS

This is a U.S. national stage entry of International Patent Application No. PCT/EP2014/072788, filed on Oct. 23, 2014, which claims priority to Denmark Patent Application No. PA 2013 70614, filed on Oct. 23, 2013, the entire contents of all of which are fully incorporated herein by reference.

FIELD OF THE INVENTION

The present invention pertains to a new type of CMP-containing, high protein denatured whey protein compositions and to a method of producing them. The invention furthermore pertains to products containing the high protein denatured whey protein compositions, particularly high protein, acidified dairy products, and additional uses thereof.

BACKGROUND

Denatured, microparticulated whey protein concentrates have for long been used as a food ingredient for the production of e.g. cheese or yoghurt. Traditionally, the products have been produced by heating a whey protein solution having a neutral to acidic pH to a protein denaturing temperature whereby whey protein gel is formed, and subsequently subjecting the gel to high shear conditions so as to convert the gel to microparticles, which can be converted to a powder by spray-drying.

PRIOR ART

U.S. Pat. No. 5,096,731 B2 discloses a yogurt where all or part of the fat and/or oil of the yogurt is replaced with microparticulated protein comprising substantially non-aggregated particles of denatured protein having a mean diameter of 0.5-2 microns when in a dry state.

U.S. Pat. No. 6,605,311 B2 discloses insoluble, denatured, heat-stable protein particles having a mean diameter of 0.1-3 microns when in a hydrated state, which are dispersible in aqueous solutions and are used in food and beverage products.

SUMMARY OF THE INVENTION

An aspect of the invention pertains to a denatured whey protein composition containing:
  a total amount of protein of at least 60% (w/w) on a dry weight basis,
  a total amount of CMP of at least 10% (w/w) relative to the total amount of protein,
  insoluble whey protein particles having a particle size in the range of 1-10 micron, where the amount of said insoluble whey protein particles is in the range of 50-90% (w/w) relative to the total amount of protein.

The present inventors have found that denatured whey protein compositions containing a significant amount of CMP contribute to an even lower viscosity than denatured whey protein compositions containing a significant amount of CMP (see Example 3).

The inventors have furthermore found that the present denatured whey protein composition, which has a relatively high protein content, provides high protein dairy products with a higher degree of milky flavour and less dryness than prior art denatured whey protein compositions (see Examples 4 and 5).

Yet an aspect of the invention pertains to a method of producing the denatured whey protein composition, the method comprising the steps of
a) providing a solution comprising whey protein, said solution having a pH in the range of 5-8, said solution comprising:
  water,
  a total amount of protein of at least 60% (w/w) on a dry weight basis,
  a total amount of CMP of at least 10% (w/w) relative to the total amount of protein,
b) heating said solution to a temperature in the range of 70-160 degrees C. and keeping the temperature of the solution within this range for sufficient time to form insoluble whey protein microparticles having a particle size in the range of 1-10 micron,
c) optionally, cooling the heat-treated solution,
d) optionally, converting the heat treated solution to a powder,
wherein at least step b) involves subjecting the solution to mechanical shear.

A further aspect of the invention pertains to a high protein food product comprising:
  a total amount of protein of at least 4% (w/w),
  the solids of a denatured whey protein composition in an amount of at least 2% (w/w)
  a total amount of CMP of at least 2% (w/w) relative to the total amount of protein.

Yet an aspect of the invention pertains to a high protein, acidified dairy product containing:
  a total amount of protein of at least 7% (w/w),
  the solids of denatured whey protein composition in an amount of at least 2% (w/w),
  a total amount of CMP of at least 2% (w/w) relative to the total amount of protein.

The high protein, acidified dairy product may for example be a high protein yoghurt.

A further aspect of the invention pertains to a method of producing a high protein, acidified dairy product, the method comprising the steps of:
a) providing a dairy base comprising at least one dairy component and at least one carbohydrate,
b) pasteurising the dairy base at a temperature in the range of 70-150 degrees C. and subsequently cooling the dairy base,
c) contacting the heat-treated dairy base with an acidifying agent,
d) allowing the acidifying agent to reduce the pH of the dairy base to a pH of at most 5, e) optionally, subjecting the acidified dairy base to one or more additional processing steps,
f) optionally, packaging the acidified dairy product in a suitable container.
wherein:
  I) the dairy base provided in step a) comprises a total amount of protein of at least 7% (w/w), the solids of a denatured whey protein composition in an amount of at least 2% (w/w), and a total amount of CMP at least 2% (w/w) relative to the total amount of protein, or II) an ingredient comprising, or even consisting of, the solids of denatured whey protein composition are added to the dairy base between steps a) and f) in an amount sufficient to form the acidified dairy product containing:
    a total amount of protein of at least 7% (w/w),
    the solids of the denatured whey protein composition in an amount of at least 2% (w/w), and
    a total amount of CMP of at least 2% (w/w) relative to the total amount of protein.

Another aspect of the invention pertains to a food ingredient powder comprising, or even consisting of:
i. the solids of the denatured whey protein composition in an amount of at least 5% (w/w),
ii. optionally, a small amount of water
iii. one or more additional components selected from the group consisting of:
    a caseinate composition,
    a concentrate of micellar casein,
    a milk protein concentrate, and
    a milk powder, such as e.g. skimmed milk powder.

DETAILED DESCRIPTION OF THE INVENTION

Figure 1:
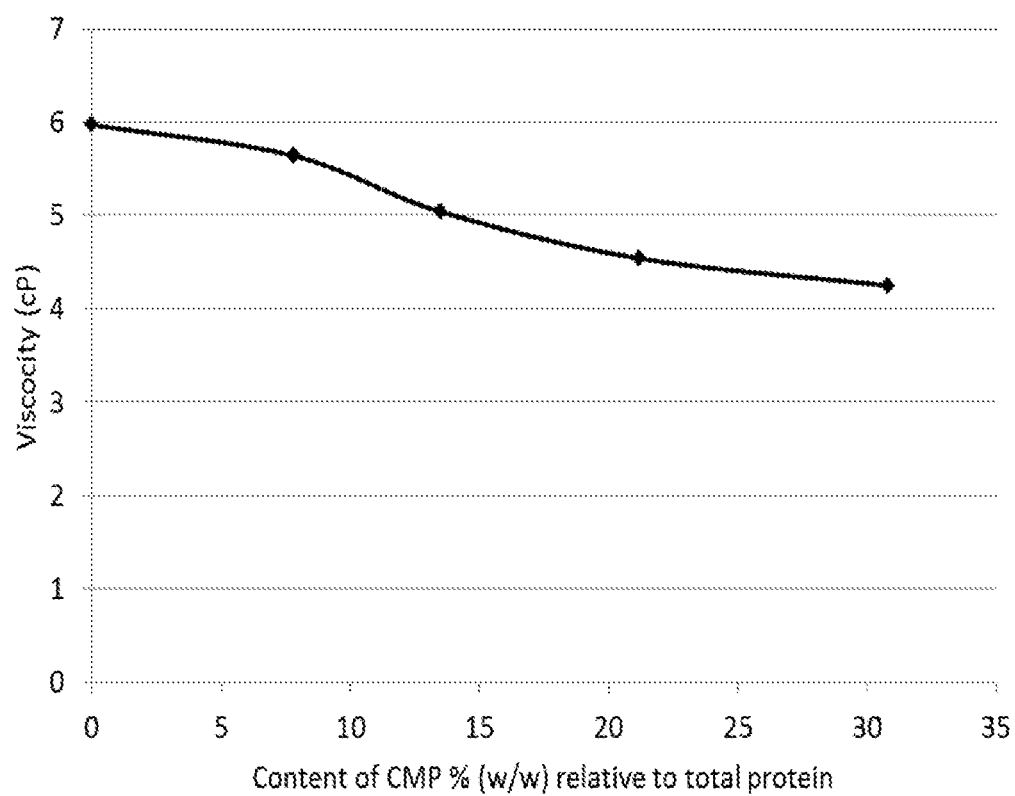
FIG. 1 shows the viscosity of low-casein drinking yoghurt as a function of the CMP-content in the yoghurt milk.

The denatured whey protein composition according to the present invention contains:
    a total amount of protein of at least 60% (w/w) on a dry weight basis, and
    insoluble whey protein particles having a particle size in the range of 1-10 micron, where the amount of said insoluble whey protein particles is in the range of 50-100% (w/w) relative to the total amount of protein.

An alternative aspect of the invention pertains to a denatured whey protein composition containing:
    a total amount of protein of at least 40% (w/w dry-matter basis),
    a weight ratio between total protein and ash content of at least 15, and
    insoluble whey protein particles having a particle size in the range of 1-10 micron, where the amount of said insoluble whey protein particles is in the range of 50-100% (w/w) relative to the total amount of protein.

In the context of the present invention, the term "total protein" pertains to the total amount of true protein of a composition or product and disregards non-protein nitrogen (NPN).

In the context of the present invention, the term "denatured whey protein composition" relates to a composition which contains at least some denatured whey protein and preferably a significant amount of denatured whey protein. The composition may also contain some non-denatured whey proteins, however, the protein of the denatured whey protein composition preferably has a degree of denaturation of at least 50%.

In the context of the present invention, the term "whey protein" relates to the proteins which are present in the serum phase of either milk or coagulated milk. The proteins of the serum phase of milk are also sometimes referred to as milk serum proteins or ideal whey.

In the context of the present invention, the term "whey" relates to the liquid composition which is left when casein has been removed from milk. Casein may e.g. be removed by microfiltration providing a liquid permeate which is free or essentially free of micellar casein but contains the native whey proteins. This liquid permeate is sometimes referred to as ideal whey, serum or milk serum.

Alternatively, the casein may be removed from milk by contacting a milk composition with rennet enzyme, which cleavages kappa-casein into para-kappa-casein and the peptide caseinomacropeptide (CMP), thereby destabilising the casein micelles and causing casein to precipitate. The liquid surrounding the rennet precipitated casein is often referred to as sweet whey and contains CMP in addition to the whey proteins which are normally found in milk.

Casein may also be removed from milk by acid precipitation, i.e. reducing the pH of the milk below pH 4.6 which is the isoelectric point of casein and which causes the casein micelles to disintegrate and precipitate. The liquid surrounding the acid precipitated casein is often referred to as acid whey or casein whey and does not contains CMP.

In the context of the present invention, the terms "native alpha-lactalbumin", "native beta-lactoglobulin", "native CMP", "soluble alpha-lactalbumin", "soluble beta-lactoglobulin" or "soluble CMP" pertain to soluble, non-denatured alpha-lactalbumin, beta-lactoglobulin or CMP which preferably has approximately the same retention time as the standard of alpha-lactalbumin, beta-lactoglobulin or CMP when assayed according to Example 1.2.

The whey proteins used in the present invention are preferably whey proteins from mammalian milk, such as e.g. milk from human, cow, sheep, goat, buffalo, camel, llama, horse and/or deer. In some preferred embodiments of the invention, the whey proteins are bovine whey proteins.

The protein CMP (caseinomacropeptide) is formed during cheese-making when chymosin specifically cleaves K-casein (normally between the 105 to 106 amino acid residues). Para-κ-casein (residues 1 to 105) coagulates, forming cheese curd, while CMP (normally residues 106 to 169) remains in the whey.

CMP (caseinomacropeptide) is a highly heterogeneous protein due to a variety of phosphorylation patterns and different extents of glycosylations by galactosamine, galactose and o-sialic acid. For this reason, a population of CMP molecules normally do not have a uniform charge but instead a distribution of charges. Thus, in the context of the present invention, the term "CMP" relates to soluble CMP which does not form part of the insoluble particles and the term encompasses:
    CMP-species which are both non-phosphorylated and non-glycosylated,
    CMP-species which are phosphorylated but non-glycosylated,
    CMP-species which are non-phosphorylated but glycosylated, and
    CMP-species which are both phosphorylated and glycosylated.

In some preferred embodiments of the invention, the denatured whey protein composition contains:
    a total amount of protein of at least 60% (w/w) on a dry weight basis,
    a total amount of CMP of at least 10% (w/w) relative to the total amount of protein,
    insoluble whey protein particles having a particle size in the range of 1-10 micron, where the amount of said insoluble whey protein particles is in the range of 50-90% (w/w) relative to the total amount of protein.

The present inventors have found that the presence of significant amounts of soluble CMP in the denatured whey protein composition is advantageous as it contributes to the emulsifying properties of the composition without forming a gel, and therefore keeps the viscosity of the product low. This is for example demonstrated in Example 6, where even small increases in the amount of CMP result in significant decreases in the viscosity of high fat, high protein beverages.

The denatured whey protein composition may e.g. contain a total amount of CMP of at least 12% (w/w) relative to the total amount of protein. For example, the denatured whey protein composition may contain a total amount of CMP of at least 14% (w/w) relative to the total amount of protein. The denatured whey protein composition may e.g. contain a total amount of CMP of at least 16% (w/w) relative to the total amount of protein. Alternatively, the denatured whey protein composition may contain a total amount of CMP of at least 18% (w/w) relative to the total amount of protein.

A higher content of CMP may be preferred, thus, the denatured whey protein composition may e.g. contain a total amount of CMP of at least 20% (w/w) relative to the total amount of protein. For example, the denatured whey protein composition may contain a total amount of CMP of at least 22% (w/w) relative to the total amount of protein. The denatured whey protein composition may e.g. contain a total amount of CMP of at least 25% (w/w) relative to the total amount of protein. Alternatively, the denatured whey protein composition may contain a total amount of CMP of at least 28% (w/w) relative to the total amount of protein.

The denatured whey protein composition may e.g. contain a total amount of CMP in the range of 10-40% (w/w) relative to the total amount of protein. For example, the denatured whey protein composition may contain a total amount of CMP in the range of 12-35% (w/w) relative to the total amount of protein. The denatured whey protein composition may e.g. contain a total amount of CMP in the range of 14-30% (w/w) relative to the total amount of protein. Alternatively, the denatured whey protein composition may contain a total amount of CMP in the range of 16-28% (w/w) relative to the total amount of protein.

It may also be preferred that the denatured whey protein composition comprises a total amount of CMP in the range of 17-30%, such as in the range of 17-28% (w/w).

The denatured whey protein composition may e.g. contain a total amount of CMP in the range of 18-26% (w/w) relative to the total amount of protein. For example, the denatured whey protein composition may contain a total amount of CMP in the range of 18-24% (w/w) relative to the total amount of protein.

As said, the total protein content of the denatured whey protein composition is preferably at least 60% (w/w). The denatured whey protein composition may e.g. comprise a total amount of protein of at least 70% (w/w) on a dry weight basis. Preferably, the denatured whey protein composition may comprise a total amount of protein of at least 75% (w/w) on a dry weight basis. Even more preferably, the denatured whey protein composition may comprise a total amount of protein of at least 80% (w/w) on a dry weight basis. Alternatively, the denatured whey protein composition may comprise a total amount of protein of at least 85% (w/w) on a dry weight basis.

As said, the protein of the denatured whey protein composition preferably has a degree of denaturation of at least 50%. For example, the protein of denatured whey protein composition may have a degree of denaturation of at least 60%. The protein of denatured whey protein composition may e.g. have a degree of denaturation of at least 70%, such as at least 75%. Alternatively, the protein of denatured whey protein composition may have a degree of denaturation of at least 80%.

The degree of denaturation is determined according to the procedure outlined in Example 1.9.

In addition to the denatured whey protein, which typically is present in the form of insoluble whey protein particles, the denatured whey protein composition may also contain minor amounts of soluble whey proteins which have not been denaturated during the heat-treatment. The denatured whey protein composition may for example comprise soluble beta-lactoglobulin and/or soluble alpha-lactalbumin. The denatured whey protein composition may furthermore contain CMP, e.g. if the whey protein has been derived from sweet whey.

In the context of the present invention, the phrase "Y and/or X" means "Y" or "X" or "Y and X". Along the same line of logic, the phrase "$n_1$, $n_2$, . . . , $n_{i-1}$, and/or $n_i$" means "$n_1$" or "$n_2$" or . . . or "$n_{i-1}$" or "$n_i$" or any combination of the components: $n_1$, $n_2$, . . . $n_{i-1}$, and $n_i$.

The denatured whey protein composition of the present invention contains insoluble whey protein particles and preferably a substantial part of the insoluble particles have a particle size in the range of 1-10 micron. The insoluble whey protein particles are typically produced by heating a solution of whey protein at an appropriate pH while subjecting the solution a high degree of internal shear. The shear may be provided by mechanical shearing, using e.g. scraped-surface heat-exchangers or homogenizers, or by subjecting the solution to high linear flow rates which promote turbulence.

It is also possible to prepare the denatured whey protein compositions using low shear or non-shear microparticulation methods. Such methods typically involve the use of relatively low concentrations of whey protein during heat-treatment and precise control of the pH and the concentration of calcium.

In the context of the present invention, the term "insoluble whey protein particles" pertains to particulate aggregates comprising denatured whey proteins, which aggregate can be separated from soluble whey protein by centrifugation.

Insoluble whey protein particles having a particle size in the range of 1-10 micron are interesting for the present invention, and in some preferred embodiments, the denatured whey protein composition comprises insoluble whey protein particles in this size range in an amount of at least 50% (w/w) relative to the total amount of protein of the composition.

The amount (% w/w relative to the total amount of protein) of insoluble whey protein particles having a particle size in the range of 1-10 micron in a denatured whey protein composition is determined according to Example 1.1 ($P_{1-10}$).

For example, the denatured whey protein composition may comprise insoluble whey protein particles having a particle size in the range of 1-10 micron in an amount of at least 60% (w/w) relative to the total amount of protein of the composition. The particle size range 1-10 micron effectively covers particles having a particle size (hydrodynamic diameter) as low as 0.5000 micron and as high as 10.4999 micron.

The denatured whey protein composition may e.g. comprise insoluble whey protein particles having a particle size in the range of 1-10 micron in an amount of at least 65% (w/w) relative to the total amount of protein of the composition. Alternatively, the denatured whey protein composition may comprise insoluble whey protein particles having a particle size in the range of 1-10 micron in an amount of at least 70% (w/w) relative to the total amount of protein of the composition. The denatured whey protein composition may for example comprise insoluble whey protein particles having a particle size in the range of 1-10 micron, in an amount of at least 75% (w/w) relative to the total amount of protein of the composition, such as in an amount of at least 80% (w/w).

A higher content of insoluble whey protein particles having a particle size in the range of 1-10 micron may be preferred for some applications. Thus, the denatured whey protein composition may comprise insoluble whey protein particles having a particle size in the range of 1-10 micron in an amount of at least 85% (w/w) relative to the total amount of protein of the composition. The denatured whey protein composition may e.g. comprise insoluble whey protein particles having a particle size in the range of 1-10 micron in an amount of at least 88% (w/w) relative to the total amount of protein of the composition. Alternatively, the denatured whey protein composition may comprise insoluble whey protein particles having a particle size in the range of 1-10 micron in an amount of at least 90% (w/w) relative to the total amount of protein of the composition, such as in an amount of at least 95% (w/w) or approx. 100% (w/w).

In some embodiments of the invention, the denatured whey protein composition may comprise insoluble whey protein particles having a particle size in the range of 1-10 micron in an amount in the range of 50-100% (w/w) relative to the total amount of protein of the composition. The denatured whey protein composition may e.g. comprise insoluble whey protein particles having a particle size in the range of 1-10 micron in an amount in the range of 60-95% (w/w) relative to the total amount of protein of the composition. Alternatively, the denatured whey protein composition may comprise insoluble whey protein particles having a particle size in the range of 1-10 micron in an amount in the range of 65-90% (w/w) relative to the total amount of protein of the composition. The denatured whey protein composition may for example comprise insoluble whey protein particles having a particle size in the range of 1-10 micron in an amount in the range of 70-85% (w/w) relative to the total amount of protein of the composition.

For example, the denatured whey protein composition may comprise insoluble whey protein particles having a particle size in the range of 1-10 micron in an amount in the range of 55-85% (w/w) relative to the total amount of protein of the composition. The denatured whey protein composition may e.g. comprise insoluble whey protein particles having a particle size in the range of 1-10 micron in an amount in the range of 60-85% (w/w) relative to the total amount of protein of the composition. Alternatively, the denatured whey protein composition may comprise insoluble whey protein particles having a particle size in the range of 1-10 micron in an amount in the range of 65-85% (w/w) relative to the total amount of protein of the composition. The denatured whey protein composition may for example comprise insoluble whey protein particles having a particle size in the range of 1-10 micron in an amount in the range of 65-80% (w/w) relative to the total amount of protein of the composition.

Insoluble whey protein particles having a particle size of approx. 1 micron are of particular interest for the present invention, and in some preferred embodiments, the denatured whey protein composition comprises insoluble whey protein particles within this size range in an amount of at least 50% (w/w) relative to the total amount of protein of the composition. The particle size of approx. 1 micron effectively covers particles having a particle size (hydrodynamic diameter) as low as 0.5000 micron and as high as 1.4999 micron. The amount (% w/w relative to the total amount of protein) of insoluble whey protein particles having a particle size of approx. 1 micron in a denatured whey protein composition is determined according to Example 1.1 ($P_1$).

For example, the denatured whey protein composition may comprise insoluble whey protein particles having a particle size of approx. 1 micron in an amount of at least 55% (w/w) relative to the total amount of protein of the composition. The denatured whey protein composition may e.g. comprise insoluble whey protein particles having a particle size of approx. 1 micron in an amount of at least 60% (w/w) relative to the total amount of protein of the composition. Alternatively, the denatured whey protein composition may comprise insoluble whey protein particles having a particle size of approx. 1 micron in an amount of at least 70% (w/w) relative to the total amount of protein of the composition. The denatured whey protein composition may for example comprise insoluble whey protein particles having a particle size of approx. 1 micron in an amount of at least 75% (w/w) relative to the total amount of protein of the composition, such as in an amount of at least 80% (w/w).

A higher content of insoluble whey protein particles having a particle size of approx. 1 micron may be preferred for some applications. Thus, the denatured whey protein composition may comprise insoluble whey protein particles having a particle size of approx. 1 micron in an amount of at least 85% (w/w) relative to the total amount of protein of the composition. The denatured whey protein composition may e.g. comprise insoluble whey protein particles having a particle size of approx. 1 micron in an amount of at least 90% (w/w) relative to the total amount of protein of the composition. Alternatively, the denatured whey protein composition may comprise insoluble whey protein particles having a particle size of approx. 1 micron in an amount of at least 95% (w/w) relative to the total amount of protein of the composition, such as in an amount of at least 97% (w/w) or approx. 100% (w/w).

For example, the denatured whey protein composition may comprise insoluble whey protein particles having a particle size of approx. 1 micron in an amount in the range of 55-85% (w/w) relative to the total amount of protein of the composition. The denatured whey protein composition may e.g. comprise insoluble whey protein particles having a particle size of approx. 1 micron in an amount in the range of 60-85% (w/w) relative to the total amount of protein of the composition. Alternatively, the denatured whey protein composition may comprise insoluble whey protein particles having a particle size of approx. 1 micron in an amount in the range of 65-85% (w/w) relative to the total amount of protein of the composition. The denatured whey protein composition may for example comprise insoluble whey protein particles having a particle size of approx. 1 micron in an amount in the range of 65-80% (w/w) relative to the total amount of protein of the composition.

Larger particles of insoluble whey protein are often less desirable as they may give rise to a sandy texture of the food products incorporating the denatured whey protein compositions.

Thus, in some preferred embodiments of the invention, the denatured whey protein composition comprises insoluble whey protein particles having a particle size of more than 10 micron in an amount of at most 10% (w/w)

relative to the total amount of protein of the composition, preferably at most 5% (w/w), and even more preferably at most 1% (w/w).

For example, the denatured whey protein composition comprises insoluble whey protein particles having a particle size of more than 10 micron in an amount of at most 10% (w/w) relative to the total amount of protein of the composition, preferably at most 5% (w/w), and even more preferably at most 1% (w/w).

Additionally, it is sometimes preferred that the amount of insoluble whey protein particles having a size below 0.5 micron is kept to a minimum as these may provide an undesirably high viscosity to the products comprising them.

Thus, in some embodiments of the invention, the denatured whey protein composition comprises insoluble whey protein particles having a particle size of less than 0.5 micron in an amount of at most 10% (w/w) relative to the total amount of protein of the composition, preferably at most 5% (w/w), and even more preferably at most 1% (w/w).

In some preferred embodiments of the invention, the denatured whey protein composition comprises:
insoluble whey protein particles having a particle size in the range of 1-10 micron in an amount of at least 50% (w/w) relative to the total amount of protein of the composition,
insoluble whey protein particles having a particle size of more than 10 micron in an amount of at most 10% (w/w) relative to the total amount of protein of the composition, and
insoluble whey protein particles having a particle size of less than 0.5 micron in an amount of at most 10% (w/w) relative to the total amount of protein of the composition.

For example, the denatured whey protein composition comprises:
insoluble whey protein particles having a particle size in the range of 1-10 micron in an amount of at least 50% (w/w) relative to the total amount of protein of the composition,
insoluble whey protein particles having a particle size of more than 10 micron in an amount of at most 5% (w/w) relative to the total amount of protein of the composition, and
insoluble whey protein particles having a particle size of less than 0.5 micron in an amount of at most 10% (w/w) relative to the total amount of protein of the composition.

Alternatively, the denatured whey protein composition may comprise:
insoluble whey protein particles having a particle size in the range of 1-10 micron in an amount of at least 50% (w/w) relative to the total amount of protein of the composition,
insoluble whey protein particles having a particle size of more than 20 micron in an amount of at most 1% (w/w) relative to the total amount of protein of the composition, and
insoluble whey protein particles having a particle size of less than 0.5 micron in an amount of at most 10% (w/w) relative to the total amount of protein of the composition.

The particle size distribution of the insoluble whey protein particles is using the procedure outlined in Example 1.1.

The denatured whey protein composition may furthermore contain salts and minerals, which typically are present in whey or milk derived products. The mineral content of food products are typically represented as the ash content of the food product.

The ash content is a measure of the total amount of minerals present within a food. Ash is the inorganic residue remaining after the water and organic matter have been removed by heating in the presence of oxidizing agents, and it should be noted that the product to which the ash content relates does not contain the ash particles as such. The ash content is preferably determined by the technique of dry ashing (see Example 1.7).

The present inventors have found that it is advantageous to reduce the ash content of the denatured whey protein composition. The reduced ash content seems to provide high protein dairy products containing the denatured whey protein composition a more milky flavour relative to high protein dairy products containing denatured whey protein ingredients having a higher ash content.

In some preferred embodiments of the invention, the denatured whey protein composition has a total protein:ash content weight ratio of at least 15. Preferably, the total protein:ash content weight ratio of the denatured whey protein composition is at least 20. Even more preferably, the total protein:ash content weight ratio of the denatured whey protein composition is at least 30. For example, the total protein:ash content weight ratio of the denatured whey protein composition may be at least 40, such as at least 50.

For example, the denatured whey protein composition may have a total protein:ash content weight ratio in the range of 15-60. The denatured whey protein composition may e.g. have a total protein:ash content weight ratio in the range of 20-55. Alternatively, the denatured whey protein composition may have a total protein:ash content weight ratio in the range of 25-50, such as in the range of 30-45.

The ash content is determined according to example 1.6 and the total protein is determined according to Example 1.4.

In addition to salts and minerals, the denatured whey protein composition furthermore typically contains fat, e.g. milk fat or whey fat. For example, the denatured whey protein composition may furthermore comprise fat in an amount of at most 8% (w/w) on a dry weight basis.

The denatured whey protein composition may furthermore comprise carbohydrate, typically in the form of lactose or lactose-based oligosaccharides. For example, the denatured whey protein composition may comprise lactose in an amount of at most 30% (w/w) on a dry weight basis. The denatured whey protein composition may e.g. comprise lactose in an amount of at most 15% (w/w) on a dry weight basis. Alternatively, the denatured whey protein composition may comprise lactose in an amount of at most 10% (w/w) on a dry weight basis.

In some preferred embodiments of the invention, the lactose content of the denatured whey protein composition is even lower, such as at most 4% (w/w) on a dry weight basis. Preferably, the lactose content of the denatured whey protein composition is at most 3% (w/w) on a dry weight basis. Even more preferably, the lactose content of the denatured whey protein composition is at most 2% (w/w) on a dry weight basis, such as at most 1% (w/w).

The present inventors have found that such compositions are particularly advantageous for preparing high protein, low lactose food products or high protein, low carbohydrate food products.

The denatured whey protein composition may be present in different forms. For example, the denatured whey protein composition may be a powder, preferably a dry powder. In the context of the present invention, a dry powder contains at most 6% (w/w) water.

Alternatively, the denatured whey protein composition may be a suspension and preferably an aqueous suspension, meaning that the insoluble particles of the denatured whey protein composition are suspended in water. In the context of the present invention, an aqueous suspension contains at least 50% (w/w) water, preferably at least 60% (w/w) water, such as at least 70% (w/w). Even higher contents of water may be preferred for some applications, thus an aqueous suspension may contain at least 80% (w/w) water, such as e.g. at least 90% (w/w) water.

The pH of a suspension of denatured whey protein composition typically ranges from 6.4-7.0 when measured by dispersing 10 g of denatured whey protein composition in 90 g water at 25 degrees C.

The contents of water in a food product may be determined according to ISO 5537:2004 (Dried milk—Determination of moisture content (Reference method)) or by NMKL 110 $2^{nd}$ Edition, 2005 (Total solids (Water)—Gravimetric determination in milk and milk products). NMKL is an abbreviation for "Nordisk Metodikkomité for Næringsmidler".

In the context of the present invention, the term "dry weight" of a composition or product relates to the weight of the composition or product when it has been dried to a water content of 3% (w/w) water.

The insoluble whey protein particles are typically produced by heating a solution of whey protein having an appropriate pH while subjecting the solution a high degree of internal shear or by adjusting the conditions of the solution so that particles build up without the generation of a continuous gel in the solution. The shear may be provided by mechanical shearing, using e.g. scraped-surface heat-exchangers or homogenizers, or by subjecting the solution to flow conditions which promote turbulence.

An aspect of the invention pertains to a method of producing a denatured whey protein composition, the method comprising the steps of
a) providing a solution comprising whey protein, said solution having a pH in the range of 5-8, said solution comprising:
  water,
  a total amount of whey protein of at least 1% (w/w)
  a total amount of protein of at least 60% (w/w) on a dry weight basis,
  a total amount of CMP of at least 10% (w/w) relative to the total amount of protein,
b) heating said solution to a temperature in the range of 70-160 degrees C. and keeping the temperature of the solution within this range for sufficient time to form insoluble whey protein microparticles having a particle size in the range of 1-10 micron,
c) optionally, cooling the heat-treated solution,
d) optionally, converting the heat-treated solution to a powder,
wherein at least step b) involves subjecting the solution to mechanical shear.

The method may comprise the steps a) and b), and c), and d) in which case the denatured whey protein composition is a powder, and preferably a dry powder.

The method may comprise the steps a) and b), and d) but not step c) in which case the heat-treated solution is subjected to powder conversion without prior cooling.

The method may comprise the steps a) and b), and c) but not step d) in which case the denatured whey protein composition could be a suspension containing insoluble whey protein particles.

The solution typically contains a total amount of whey protein of at least 1% (w/w) relative to the weight of the solution, such as e.g. at least 5% (w/w). For example, the solution may contain a total amount of whey protein of at least 10% (w/w). The solution may e.g. contain a total amount of whey protein of at least 15% (w/w). Alternatively, the solution may contain a total amount of whey protein of at least 20% (w/w).

The solution may for example contain a total amount of whey protein in the range of 1-50% (w/w). For example, the solution may contain a total amount of whey protein in the range of 5-40% (w/w). The solution may e.g. contain a total amount of whey protein in the range of 10-30% (w/w). Alternatively, the solution may contain a total amount of whey protein in the range of 15-25% (w/w).

It is furthermore preferred that the solution contains a total amount of whey protein of at least 60% (w/w) on a dry weight basis, such as e.g. at least 70% (w/w) on a dry weight basis. For example, the solution may contain a total amount of whey protein of at least 75% (w/w) on a dry weight basis. The solution may e.g. contain a total amount of whey protein of at least 80% (w/w) on a dry weight basis. Alternatively, the solution may contain a total amount of whey protein of at least 85% (w/w) on a dry weight basis.

The solution may for example contain a total amount of whey protein in the range of 60-100% (w/w) on a dry weight basis. For example, the solution may contain a total amount of whey protein in the range of 65-95% (w/w) on a dry weight basis. The solution may e.g. contain a total amount of whey protein in the range of 70-90% (w/w) on a dry weight basis. Alternatively, the solution may contain a total amount of whey protein in the range of 75-85% (w/w) on a dry weight basis.

The whey protein used in the solution may be whey protein from acid whey, whey protein from sweet whey and/or milk protein from milk serum.

The solution preferably contains beta-lactoglobulin, which is an important component for the formation of insoluble whey protein particles. The solution may furthermore contain one or more of the additional proteins found in whey, for example alpha-lactalbumin and/or CMP.

In some preferred embodiments of the invention, the solution contains a total amount of CMP of at least 12% (w/w) relative to the total amount of protein. For example, the solution may contain a total amount of CMP of at least 14% (w/w) relative to the total amount of protein. The solution may e.g. contain a total amount of CMP of at least 16% (w/w) relative to the total amount of protein. Alternatively, the solution may contain a total amount of CMP of at least 18% (w/w) relative to the total amount of protein.

Solutions having a higher content of CMP may be preferred, thus, the solution may e.g. contain a total amount of CMP of at least 20% (w/w) relative to the total amount of protein. For example, the solution may contain a total amount of CMP of at least 22% (w/w) relative to the total amount of protein. The solution may e.g. contain a total amount of CMP of at least 25% (w/w) relative to the total amount of protein. Alternatively, the solution may contain a total amount of CMP of at least 28% (w/w) relative to the total amount of protein.

The solution may e.g. contain a total amount of CMP in the range of 10-40% (w/w) relative to the total amount of protein. For example, the solution may contain a total amount of CMP in the range of 12-35% (w/w) relative to the total amount of protein. The solution may e.g. contain a total amount of CMP in the range of 14-30% (w/w) relative to the total amount of protein. Alternatively, the solution may contain a total amount of CMP in the range of 16-28% (w/w) relative to the total amount of protein.

The solution may e.g. contain a total amount of CMP in the range of 18-26% (w/w) relative to the total amount of protein. For example, the solution may contain a total amount of CMP in the range of 18-24% (w/w) relative to the total amount of protein.

The present inventors have found that increasing amounts of CMP in the solution reduces burning and fouling in the SSHE and increases the time the production plant can operate between cleaning cycles.

In some preferred embodiments of the invention, the solution contains a total amount of soluble alpha-lactalbumin of at most 16% (w/w) relative to the total amount of protein. For example, the solution may contain a total amount of soluble alpha-lactalbumin of at most 12% (w/w) relative to the total amount of protein. The solution may e.g. contain a total amount of soluble alpha-lactalbumin of at most 10% (w/w) relative to the total amount of protein. Alternatively, the solution may contain a total amount of soluble alpha-lactalbumin of at most 8% (w/w) relative to the total amount of protein.

A lower concentration of soluble alpha-lactalbumin may be preferred, thus, the solution may contain a total amount of soluble alpha-lactalbumin of at most 6% (w/w) relative to the total amount of protein. For example, the solution may contain a total amount of soluble alpha-lactalbumin of at most 4% (w/w) relative to the total amount of protein.

The solution may e.g. contain a total amount of soluble alpha-lactalbumin of at most 2% (w/w) relative to the total amount of protein. Alternatively, the solution may contain a total amount of soluble alpha-lactalbumin of at most 1% (w/w) relative to the total amount of protein, such as e.g. substantially no soluble alpha-lactalbumin.

In some preferred embodiments of the invention, the solution contains a total amount of soluble alpha-lactalbumin in the range of 1-16% (w/w) relative to the total amount of protein. For example, the solution may contain a total amount of soluble alpha-lactalbumin in the range of 2-12% (w/w) relative to the total amount of protein. The solution may e.g. contain a total amount of soluble alpha-lactalbumin in the range of 3-10% (w/w) relative to the total amount of protein. Alternatively, the solution may contain a total amount of soluble alpha-lactalbumin in the range of 4-8% (w/w) relative to the total amount of protein.

The solution of step a) may e.g. contain a total amount of soluble beta-lactoglobulin in the range of 20-100% (w/w) relative to the total amount of protein. For example, the solution may contain a total amount of soluble beta-lactoglobulin in the range of 30-80% (w/w) relative to the total amount of protein. The solution may e.g. contain a total amount of soluble beta-lactoglobulin in the range of 35-70% (w/w) relative to the total amount of protein. Alternatively, the solution may contain a total amount of soluble beta-lactoglobulin in the range of 40-60% (w/w) relative to the total amount of protein.

The pH of the solution is typically in the range of 5-8. For example, the pH of the solution may be in the range of 5.0-8.0. The pH of the solution may e.g. be in the range of 5.5-7.5. Alternatively, the pH of the solution may e.g. be in the range of 6.0-7.0, such as in the range of 6.0-6.5.

All pH-values presented herein have been measured in liquids/solutions having a temperature of 25 degrees C. unless specified otherwise.

While the content of divalent cations in the solution of step a) may vary, it is often preferred that the solution e.g. contains a total amount of elemental Ca in the range of 0.05-3% (w/w) on a dry weight basis. For example, the solution may contain a total amount of elemental Ca in the range of 0.1-1.5% (w/w) on a dry weight basis. The solution may e.g. contain a total amount of elemental Ca in the range of 0.2-1.0% (w/w) on a dry weight basis. Alternatively, the solution may contain a total amount of elemental Ca in the range of 0.3-0.8% (w/w) on a dry weight basis.

Whey contains lactose and the solution of step a) will typically contain some lactose as well. In some embodiments of the invention, the solution contains at most 30% (w/w) lactose on a dry weight basis. For example, the solution may contain at most 20% (w/w) lactose on a dry weight basis. The solution may e.g. contain at most 10% (w/w) lactose on a dry weight basis. Alternatively, the solution may contain at most 5% (w/w) lactose on a dry weight basis.

The present inventors have found that solutions having a low lactose content are advantageous for producing denatured whey protein compositions for low carbohydrate or lactose-free applications. Thus, in some preferred embodiments of the invention the solution contains at most 4% (w/w) lactose. For example, the solution may contain at most 3% (w/w) lactose on a dry weight basis. The solution may e.g. contain at most 2% (w/w) lactose on a dry weight basis. Alternatively, the solution may contain at most 1% (w/w) lactose on a dry weight basis.

For example, the solution may contain at most 0.5% (w/w) lactose on a dry weight basis, such as e.g. substantially no lactose.

The dry-matter content (solid content) of the solution of step a) is typically in the range of 2-50% (w/w). For example, the solution may have a dry-matter content in the range of 5-40% (w/w). The solution may e.g. have a dry-matter content in the range of 10-30% (w/w). Alternatively, the solution may contain a total amount of elemental Ca in the range of 0.3-0.8% (w/w) on a dry weight basis.

The solution typically contains at most 15% fat (w/w) on a dry weight basis. For example, the solution may contain at most 12% fat (w/w) on a dry weight basis. The solution may e.g. contain at most 10% fat (w/w) on a dry weight basis. Alternatively, the solution may contain at most 8% (w/w) fat on a dry weight basis, such as e.g. at most 6% fat (w/w) on a dry weight basis.

During the heat-treatment of step b), the solution should reach a temperature where denaturation of whey protein and formation of insoluble whey protein particles take place. The solution should preferably be heated to a temperature of at least 70 degrees C., and e.g. to a temperature in the range of 70-160 degrees C. The temperature of the solution should be kept within this range for sufficient time to form insoluble whey protein microparticles having a particle size in the range of 1-10 micron. The solution is typically held within the above temperature range for 1 second-30 minutes, depending on which temperature(s) is (are) used. Higher temperatures tend to require a short heat-treatment whereas relatively low temperatures require a longer treatment.

In some preferred embodiments of the invention, the heat-treatment temperature range is 70-160 degrees C. For example, the heat-treatment temperature range may be in the range of 72-140 degrees C. The heat-treatment temperature range may e.g. be in the range of 74-120 degrees C.

Alternatively, the heat-treatment temperature range may be in the range of 75-120 degrees C.

In some embodiments of the invention, the heat-treatment temperature range is 70-120 degrees C. For example, the heat-treatment temperature range may be in the range of 72-100 degrees C. The heat-treatment temperature range may e.g. be in the range of 74-95 degrees C. Alternatively, the heat-treatment temperature range may be in the range of 76-90 degrees C.

As said, the duration of the heat-treatment, i.e. the duration in which the solution has a temperature within the heat-treatment temperature range is typically 1 second-30 minutes. For example, the duration of the heat-treatment may be in the range of 5 seconds to 10 minutes. The duration of the heat-treatment may e.g. be in the range of 10 seconds to 5 minutes. Alternatively, the duration of the heat-treatment may be in the range of 30 seconds to 2 minutes.

The heat-treatment of step b) and optionally also the cooling of step c) involves subjecting the solution to mechanical shear, e.g. using shearing units such as using scraped-surface heat-exchangers, homogenisers and/or high shear mixers.

The mechanical shear may e.g. be present while the temperature of the solution is raised to the heat-treatment temperature range, particularly during the last phase where the temperature of the solution reaches the denaturation temperature of beta-lactoglobulin (approx. 68 degrees C.). Additionally, it may be preferred to maintain the high shear conditions while the solution is kept at a temperature within the heat-treatment temperature range.

It is furthermore preferred to subject the heat-treated solution to high shear during the cooling of step c), provided that the method involves a cooling step.

In the context of the present invention, the term "mechanical shear" relates to shear provided by mechanical agitation of the solution including the action of scraped-surface heat-exchangers, homogenisers, high shear mixers and/or high pressure pumps.

Non-limiting examples of suitable forms of mechanical shear include high shear mixing, homogenization (e.g. operating at a pressure in excess of about 5000 psi (351.55 kg/cm$^2$), colloid milling (e.g. operating with a gap size of about 1 micron to about 20 microns), operation of a scraped-surface heat-exchanger (e.g. at a rate of at least 200 RPM) and combinations thereof.

The method of producing the denatured whey protein composition may furthermore include other steps which e.g. may form part of steps b), c) or d), or which may take place between steps a) and b), between steps b) and c), and between steps c) and d), or which may even take place after step d).

In some preferred embodiments of the invention, the method involves a step d) of converting the heat-treated solution to a powder, e.g. by drying, freeze-drying or spray-drying.

Finally, the denatured whey protein composition is packaged in a suitable container.

As an alternative to the above-mentioned method of producing the denatured whey protein composition, it is possible to microparticulate a low CMP, or even CMP-free, whey protein solution and add purified CMP to the low CMP whey protein microparticles, thereby obtaining a high CMP denatured whey protein composition.

The present denatured whey protein composition may be used as a food ingredient and preferably as an ingredient for high protein food products.

In the context of the present invention, the term "food" relates to ingestible products in general and therefore encompasses both liquid foods such as beverages, semi-liquid foods (e.g. gels or highly viscous foods products such as spreadable cheese) and non-liquid foods such as bread or hard cheese.

Thus, an aspect of the invention pertains to a high protein, food product comprising
    a total amount of protein of at least 4% (w/w),
    the solids of the denatured whey protein composition in an amount of at least 2% (w/w).

In the context of the present invention, the term "solids" of a composition pertains to the material that would be left if all water of the composition was completely removed. For example, fats, carbohydrates, proteins and minerals all form part of the solids of a composition. The solid content of a food product is preferably determined according to Example 1.7.

In some preferred embodiments of the invention, the high protein, food product has a total amount of protein of at least 7% (w/w), such as e.g. at least 8% (w/w). For example, the high protein, food product may have a total amount of protein of at least 10% (w/w). The high protein, food product may e.g. have a total amount of protein of at least 12% (w/w). Alternatively, the high protein food product may e.g. have a total amount of protein of at least 14% (w/w).

An even higher protein content may be desired, thus, the high protein food product may have a total amount of protein of at least 16% (w/w). The high protein food product may e.g. have a total amount of protein of at least 18% (w/w). Alternatively, the high protein food product may e.g. have a total amount of protein of at least 21% (w/w).

Typically, the high protein, acidified dairy product has a total amount of protein in the range of 7-25% (w/w). For example, the high protein, food product may contain a total amount of protein in the range of 8-20% (w/w). The high protein, food product may e.g. contain a total amount of protein of at least 10-18% (w/w). Alternatively, the high protein food product may contain a total amount of protein of at least 12-16% (w/w).

In some embodiments of the invention, the high protein food product contains a total amount of protein in the range of 21-25% (w/w).

While the high protein food product contains the solids of the denatured whey protein composition in an amount of at least 2% (w/w), it is often preferred that the denatured whey protein composition is used at even higher concentrations. For examples, the high protein food product may contain the solids of the denatured whey protein composition in an amount of at least 4% (w/w). The high protein food product may e.g. contain the solids of the denatured whey protein composition in an amount of at least 6% (w/w). Alternatively, the high protein food product may contain the solids of the denatured whey protein composition in an amount of at least 8% (w/w). The high protein food product may e.g. contain the solids of the denatured whey protein composition in an amount of at least 10% (w/w), such as at least 15%.

The high protein food product typically contains the solids of the denatured whey protein composition in an amount in the range of 2-30% (w/w). For example, the high protein food product may contain the solids of the denatured whey protein composition in an amount in the range of 4-25% (w/w). The high protein food product may e.g. contain the solids of the denatured whey protein composition in an amount in the range of 6-20% (w/w). Alternatively, the high protein food product may contain the solids of the denatured whey protein composition in an amount in the range of 8-18% (w/w). The high protein food product may e.g. contain the solids of the denatured whey protein composition in an amount in the range of 10-16% (w/w).

The food product containing the denatured whey protein composition may further comprise one of more fats. In the present context, the term "fat" relates to the triglycerides in general and includes both fats which have a solid fat content of at least 50% (w/w) at degrees C. and fats which have a solid fat content of less than 50% (w/w) at 25 degrees C. (sometimes referred to as "oils"). The one or more fats may be derived from a vegetable fat source and/or an animal fat source.

According to one embodiment, the food product comprises one or more vegetable oil(s) selected from the group consisting of maize oil, sesame oil, soya oil, soya bean oil, linseed oil, grape seed oil, rapeseed oil, olive oil, groundnut oil, sunflower oil, safflower oil and a combination thereof. Alternatively, where the food product comprises one or more vegetable fat(s), the fat(s) may be selected from the group consisting of palm fat, palm kernel fat and cocoanut fat and a combination thereof.

According to a second embodiment, the food product comprises one or more animal fats, such as a milk fat. The milk fat may be derived from cream, butter or sweet butter milk solids.

The food product containing the denatured whey protein composition may have a fat content in the range of 1-50% (w/w) relative to the dry weight of the food product, where the fat may be of vegetable and/or animal origin as described above. Where the food product is fat-enriched, it may have a fat content in the range of 5-40% (w/w) relative to the dry weight of the food product; or have a fat content in the range of 10-30% (w/w) relative to the dry weight of the food product. Where the food product has a low fat content, it may have a fat content in the range of 0.1-10% (w/w) relative to the dry weight of the food product; preferably in the range of 0-1.0% (w/w) relative to the dry weight of the food product.

The food product containing the denatured whey protein composition may comprise one of more carbohydrates which may provide sweetness and nutritional energy to the product. The one or more carbohydrates may be a native component of the denatured whey protein composition, such as e.g. lactose. The food product may contain one or more additional carbohydrate in the form of di- and mono-saccharides such as sucrose, maltose, lactose, dextrose, glucose, fructose, galactose and a combination thereof that provide both nutritional energy and a sweet taste when the food product is ingested.

Other types of carbohydrate which may be present in the food product are oligosaccharides or polysaccharides. Oligosaccharides and polysaccharides normally do not contribute to the sweetness of the food product but may be beneficial for the microbial environment of the gastrointestinal system of mammals, e.g. as a source of energy for the probiotic microorganisms of the gastrointestinal system and/or a general source of food fibres.

The food product may contain one of more additional carbohydrates derived from mammalian milk or a derivative thereof.

In some embodiments, the food product containing the denatured whey protein composition comprises a total amount of carbohydrate in the range of 1-80% (w/w) relative to the dry weight of the food product. In a further embodiment, the food product comprises a first carbohydrate component in addition to the native carbohydrate which may be present in the denatured whey protein composition, where the amount of the first carbohydrate component is in the range of 1-80% (w/w) relative to the dry weight of the food product.

A food product containing the denatured whey protein composition may further comprise casein. Casein is a phosphoprotein found in milk, which is mainly found in the form of micelles in milk. Alternatively, the casein may be used in the form of the caseinate, which is typically prepared by acidification of skimmed milk.

Thus, the food product may comprise micellar casein and/or caseinate.

In one embodiment, the food product containing the denatured whey protein composition comprises a total amount of casein in the range of 0-20% (w/w) relative to the dry weight of the food product, preferably in the range of 6-18% (w/w); more preferably in the range of 10-16% (w/w), and even more preferably in the range of 12-13% (w/w) relative to the dry weight of the food product.

Additionally, the food product may contain non-dairy protein such as animal, non-dairy protein, e.g. gelatine, or vegetable protein such as gluten, soy protein and/or pea protein.

In some embodiments of the invention, the food product may furthermore contain one or more native whey protein(s), however, in other embodiments, the presence of native whey protein is less desirable.

A suitable source of milk proteins comprised in the food product of the invention may be derived from either liquid or dried whole milk, non-fat milk, skimmed-milk, semi-skimmed milk and butter milk.

A food product containing the denatured whey protein composition may further comprise one or more non-carbohydrate natural or artificial sweeteners.

In one embodiment, the food product contains one or more natural sweetening agent(s) selected from the group consisting of *Momordica Grosvenorii* (Mogrosides IV or V) extracts, Rooibos extracts, Honeybush extracts, *Stevia*, Rebaudioside A, thaumatin, Brazzein, Glycyrrhyzic acid and its salts, Curculin, Monellin, Phylloducin, Rubusosides, Mabinlin, dulcoside A, dulcoside B, siamenoside, monatin and its salts (monatin SS, RR, RS, SR), thaumatin, hernandulcin, phyllodulcin, glycyphyllin, phloridzin, trilobatin, baiyunoside, osladin, polypodoside A, pterocaryoside A, pterocaryoside B, mukurozioside, phlomisoside I, periandrin I, abrusoside A, cyclocarioside I, erythritol, isomaltulose, and/or natural polyol sweeteners such as maltitol, mannitol, lactitol, sorbitol, inositol, xylitol, threitol, galactitol and combinations thereof.

In one embodiment, the food product contains one or more artificial sweetening agent(s) selected from the group consisting of Aspartame, Cyclamate, Sucralose, Acesulfame K, neotame, Saccharin, Neohesperidin dihydrochalcone and combinations thereof.

A food product containing the denatured whey protein composition may comprise one or more mineral(s) such as phosphorus, magnesium, iron, zinc, manganese, copper, chromium, iodine, sodium, potassium, chloride and combinations thereof.

The one or more mineral(s) may be a native component of the denatured whey protein composition, and/or the food product may be provided as an additional source of mineral(s). A suitable source of minerals includes milk or milk derivatives that contain the inorganic salts elemental calcium, elemental phosphorous, elemental magnesium and elemental potassium.

A food product containing the denatured whey protein composition may e.g. have a total ash content (i.e. salts and minerals content) in the range of 0.1-10% (w/w) relative to the dry weight of the food product; preferably in the range of 0.5-8% (w/w), more preferably in the range of 1-5% (w/w) relative to the dry weight of the food product.

A food product containing the denatured whey protein composition may for example have an elemental calcium content in the range of 0.3-2% (w/w) relative to the dry weight of the food product; preferably in the range of 0.5-1.5% (w/w), more preferably in the range of 0.7-1% (w/w) relative to the dry weight of the food product.

A food product containing the denatured whey protein composition may for example have an elemental phosphorous content in the range of 0.1-1.5% (w/w) relative to the dry weight of the food product; preferably in the range of 0.3-1% (w/w), more preferably in the range of 0.5-0.8% (w/w) relative to the dry weight of the food product.

A food product containing the denatured whey protein composition may have a sodium chloride content in the range of 0.5-0.8% (w/w) relative to the dry weight of the food product.

A food product containing the denatured whey protein composition may further comprise one of more vitamin(s) and similar other ingredients such as vitamin A, vitamin D, vitamin E, vitamin K, thiamine, riboflavin, pyridoxine, vitamin B12, niacin, folic acid, pantothenic acid, biotin, vitamin C, choline, inositol, their salts, their derivatives, and combinations thereof.

A food product containing the denatured whey protein composition may further comprise one of more stabilizer(s). Suitable stabilizers which can be used in the present invention include locust bean gum, guar gum, alginates, cellulose, xanthan gum, carboxymethyl cellulose, microcrystalline cellulose, carrageenans, pectins, inulin and mixtures thereof.

The content of the one of more stabilisers may e.g. be in the range of 0.01-5% (w/w) relative to the dry weight of the food product, preferably in the range of 0.1 to 0.5% (w/w).

A food product containing the denatured whey protein composition may further comprise one of more emulsifier(s). Suitable emulsifiers to be used are mono- and di-glycerides, citric acid esters of mono- and di-glycerides, diacetyltartaric acid esters of mono- and di-glycerides polysorbate, lecithin, or polyol esters of fatty acids such as propylene glycol monoester of fatty acids, as well as natural emulsifiers such as egg yolk, butter milk, raw acacia gum, rice bran extract or mixtures thereof.

The content of the one of more emulsifier(s) may be in the range of 0.01-3% (w/w) relative to the dry weight of the food product, for example in the range of 0.1 to 0.5% (w/w).

The denatured whey protein composition is advantageously used as a dairy-based ingredient in the production of dairy products. The present denatured whey protein composition is even more advantageous for high protein dairy products, i.e. dairy products which contain a total amount of protein of at least 7%.

Thus, an aspect of the invention relates to a high protein dairy product containing:
  a total amount of protein of at least 7% (w/w), and
  the solids of the denatured whey protein composition in an amount of at least 2% (w/w).

The high protein dairy product preferably contains a total amount of CMP of at least 2% (w/w) relative to the total amount of protein.

In some preferred embodiments, the high protein dairy product is a high protein, acidified dairy product containing:
  a total amount of protein of at least 7% (w/w), and
  the solids of the denatured whey protein composition in an amount of at least 2% (w/w).

In the context of the present invention, the term "acidified dairy product" relates to a dairy product having a pH of at most 5.5, and e.g. less, such as at most 5.0 or even at most 4.7. An acidified dairy product may even have a pH of at most 4.4. The pH range of an acidified dairy product is typically pH 3.5-5.5. Preferably, the acidified dairy product has a pH in the range of pH 4.0-5.0. Even more preferably, the acidified dairy product has a pH in the range of pH 4.2-4.8, such as e.g. approx. pH 4.6.

In some preferred embodiments of the invention, the high protein, acidified dairy product has a total amount of protein of at least 8% (w/w). For example, the high protein, acidified dairy product may have a total amount of protein of at least 10% (w/w). The high protein, acidified dairy product may e.g. have a total amount of protein of at least 12% (w/w). Alternatively, the high protein, acidified dairy product may e.g. have a total amount of protein of at least 14% (w/w).

An even higher protein content may be desired, thus, the high protein, acidified dairy product may have a total amount of protein of at least 16% (w/w). The high protein, acidified dairy product may e.g. have a total amount of protein of at least 18% (w/w). Alternatively, the high protein, acidified dairy product may e.g. have a total amount of protein of at least 21% (w/w).

Typically, the high protein, acidified dairy product has a total amount of protein in the range of 7-25% (w/w). For example, the high protein, acidified dairy product may have a total amount of protein in the range of 8-20% (w/w). The high protein, acidified dairy product may e.g. have a total amount of protein of at least 10-18% (w/w). Alternatively, the high protein, acidified dairy product may e.g. have a total amount of protein of at least 12-16% (w/w).

In some embodiments of the invention, the high protein, acidified dairy product has a total amount of protein in the range of 21-25% (w/w).

In some preferred embodiments of the invention, the high protein, acidified dairy product is a yoghurt.

In the context of the present invention, the term "yoghurt" refers to an acidic or fermented food or beverage product prepared from one or more dairy components, and which has been acidified by means of microorganisms and/or chemical acidulants. It should be noted that the term "yoghurt" also refers to yoghurt-like products that may include non-dairy derived lipids, flavourings and food-approved stabilisers, acids and texturizers. Heat-treated yoghurt and yoghurt-like products are also included by the term yoghurt. The term "yoghurt" includes set yoghurts, stirred yoghurts, drinking yoghurt and Petit Suisse.

The yoghurts according to the present invention may, but need not, contain casein.

For example, the high protein yoghurt may have a weight ratio between casein and whey protein of at most 50:50. For example, the weight ratio between casein and whey protein of the high protein yoghurt may be at most 30:70. The weight ratio between casein and whey protein of the high protein yoghurt may e.g. be at most 20:80. Alternatively, the weight ratio between casein and whey protein of the high protein yoghurt may e.g. be at most 15:85, such as e.g. at most 10:90.

In some preferred embodiments of the invention, high protein yoghurt is a set yoghurt. Set yoghurts (or set-type yoghurts) are typically characterised in a gelly-like texture and are often allowed to incubate and cool in the final package. Set yoghurts are normally non-pourable and are often eaten out of the packaging with a spoon.

In other preferred embodiments of the invention the high protein yoghurt is a stirred yoghurt. Relative to a set yoghurt, a stirred yoghurt is pourable but often still rather viscous. The term "stirred" is most likely based on the fact that the acidified yoghurt milks originally were stirred to break the formed coagulum/gel and make the product more liquid and pumpable. However, in the context of the present invention, the term "stirred yoghurt" also encompasses yoghurts which have not been subjected to stirring, but which have obtained a liquid-like, viscous texture by other ways.

A stirred yoghurt may for example have a viscosity of at most 2500 cP, and typically in the range of 350-2500 cP. For example, the viscosity of the stirred yoghurt may be in the range of 400-2000 cP. The viscosity of the stirred yoghurt may e.g. be in the range of 500-1500 cP. Alternatively, the viscosity of the stirred yoghurt may be in the range of 600-1250 cP.

In further preferred embodiments of the invention, the high protein yoghurt is a drinking yoghurt, which may be perceived as low viscosity, drinkable yoghurt. A drinking yoghurt may for example have a viscosity of at most 400 cP, and typically in the range of 4-400 cP. For example, the viscosity of the drinking yoghurt may be in the range of 10-300 cP. The viscosity of the drinking yoghurt may e.g. be in the range of 15-200 cP. Alternatively, the viscosity of the drinking yoghurt may be in the range of 20-150 cP.

In some preferred embodiments of the invention, the high protein, acidified dairy product, e.g. a high protein yoghurt, comprises one or more sweeteners, such as carbohydrate sweeteners, polyols and/or high intensity sweeteners.

The high protein, acidified dairy product, e.g. a high protein yoghurt, may e.g. comprise a total amount of carbohydrate sweetener in the range of 1-20% (w/w) relative to the total weight of the acidified dairy product. Alternatively, the acidified dairy product, e.g. a high protein yoghurt, may comprise a total amount of carbohydrate sweetener in the range of 4-15% (w/w) relative to the total weight of the acidified dairy product. Since other ingredients of the acidified dairy product inherently may comprise some carbohydrate sweetener, such as lactose, it will often be sufficient to add carbohydrate sweetener in an amount of about 2-10% relative to the total weight of the acidified dairy product to reach the desired sweetness of taste. Alternatively, the acidified dairy product may comprise a total amount of added carbohydrate sweetener in the range of 4-8% (w/w) relative to the total weight of the acidified dairy product.

A high protein, acidified dairy product, e.g. a high protein yoghurt, containing the denatured whey protein composition may further comprise one or more non-carbohydrate natural or artificial sweeteners.

In one embodiment the high protein, acidified dairy product, e.g. a high protein yoghurt, contains one or more natural sweetening agent(s) that are not sugars. These natural sweetening agent(s) may be provided as a component of a second sweetening agent, either alone or in combination with a carbohydrate sweetener, as described. The natural non-sugar sweetening agent(s) may for example be selected from the group consisting of *Momordica Grosvenorii* (Mogrosides IV or V) extracts, Rooibos extracts, Honeybush extracts, *Stevia* extract, Rebaudioside A, thaumatin, Brazzein, Glycyrrhyzic acid and its salts, Curculin, Monellin, Phylloducin, Rubusosides, Mabinlin, dulcoside A, dulcoside B, siamenoside, monatin and its salts (monatin SS, RR, RS, SR), hernandulcin, phyllodulcin, glycyphyllin, phloridzin, trilobatin, baiyunoside, osladin, polypodoside A, pterocaryoside A, pterocaryoside B, mukurozioside, phlomisoside I, periandrin I, abrusoside A, cyclocarioside I, erythritol, isomaltulose and/or natural polyols such as maltitol, mannitol, lactitol, sorbitol, inositol, xylitol, threitol, galactitol and combinations thereof.

In one embodiment the high protein, acidified dairy product, e.g. a high protein yoghurt, contains one or more artificial sweetening agent(s). These artificial sweetening agent(s) may be provided as a component of the first sweetener, either alone or in combination with other of the sweeteners as defined above. The artificial non-sugar sweetening agent(s) may for example be selected from the group consisting of Aspartame, Cyclamate, Sucralose, Acesulfame K, neotame, Saccharin, Neohesperidin dihydrochalcone, *Stevia* extract, Rebaudioside A, thaumatin, Brazzein, Glycyrrhyzic acid and its salts, Curculin, Monellin, Phylloducin, Rubusosides, Mabinlin, dulcoside A, dulcoside B, siamenoside, monatin and its salts (monatin SS, RR, RS, SR), and combinations thereof.

In some embodiments of the invention, it is particularly preferred that the sweetener comprises or even consists of one or more high intensity sweeteners (HIS). HIS are both found among the natural and the artificial sweeteners and typically have a sweetening intensity of at least 10 times that of sucrose. Non-limiting examples of useful HIS are Aspartame, Cyclamate, Sucralose, Acesulfame K, neotame, Saccharin, Neohesperidin dihydrochalcone and combinations thereof.

If used, the total amount of HIS is typically in the range of 0.01-2% (w/w). For example, the total amount of HIS may be in the range of 0.05-1.5% (w/w). Alternatively, the total amount of HIS may be in the range of 0.1-1.0% (w/w).

It may furthermore be preferred that sweetener comprises or even consists of one or more polyol sweetener(s). Non-limiting examples of useful polyol sweetener are maltitol, mannitol, lactitol, sorbitol, inositol, xylitol, threitol, galactitol or combinations thereof.

If used, the total amount of polyol sweetener is typically in the range of 1-20% (w/w). For example, the total amount of polyol sweetener may be in the range of 2-15% (w/w). Alternatively, the total amount of polyol sweetener may be in the range of 4-10% (w/w).

In one embodiment, the high protein, acidified dairy product, e.g. a high protein yoghurt, contains the casein, e.g. in the form of caseinate or micellar casein. The use of micellar casein is sometimes preferred as it contributes less to the viscosity of the final product than caseinate.

Examples of suitable sources of micellar casein are whole milk, non-fat milk, skimmed-milk, semi-skimmed milk and butter milk. These sources may be used both as liquid milk or in dried, powdered form.

The caseinate may e.g. be Na-caseinate or Ca-caseinate or other caseinate salts.

High protein yoghurt may e.g. contain casein in an amount in the range of 0-90% (w/w) relative to the total amount of protein, such as e.g. in the range of 0-70% (w/w) relative to the total amount of protein. When using a high casein level the yoghurts tend to become highly viscous and may even form a non-pourable gel. Stirred high protein yoghurts often contain casein in an amount in the range of 25-60% (w/w) relative to the total amount of protein, such as e.g. in the range of 30-55% (w/w) relative to the total amount of protein, or even in the range of 35-50% (w/w) relative to the total amount of protein.

High protein drinking yoghurt may e.g. contain casein in an amount in the range of 0-35% (w/w) relative to the total amount of protein, such as e.g. in the range of 0-30% (w/w) relative to the total amount of protein. High protein drinking yoghurts may e.g. contain casein in an amount in the range of 5-30% (w/w) relative to the total amount of protein. For example, high protein drinking yoghurts may contain casein in an amount in the range of 10-30% (w/w) relative to the total amount of protein. Alternatively, high protein drinking yoghurts may contain casein in an amount in the range of 15-30% (w/w) relative to the total amount of protein, or even in the range of 20-30% (w/w) relative to the total amount of protein.

In some embodiments of the invention, the acidified dairy product, e.g. a high protein yoghurt, furthermore contains native whey protein e.g. in the form for whey protein concentrates or whey protein isolates. Native whey protein is also provided by several milk protein sources such as liquid or dried milk and by milk protein concentrates.

High protein yoghurt may e.g. contain native whey protein in an amount in the range of 0-40% (w/w) relative to the total amount of protein, such as e.g. in the range of 2-30% (w/w) relative to the total amount of protein. High protein yoghurts may e.g. contain native whey protein in an amount in the range of 3-30% (w/w) relative to the total amount of protein. For example, high protein yoghurts may contain native whey protein in an amount in the range of 4-25% (w/w) relative to the total amount of protein. Alternatively, high protein yoghurts may contain native whey protein in an amount in the range of 5-20% (w/w) relative to the total amount of protein, or even in the range of 6-15% (w/w) relative to the total amount of protein.

It should be noted that while both casein and native whey protein may be present in the ingredients of the acidified dairy product, such a high protein yoghurt, they often aggregate and form part of gel networks and/or particles during the processing of the acidified dairy product—especially if prolonged pasteurisation is involved. The amounts of protein components of the acidified dairy product which are mentioned herein therefore primarily relate to the ingredients which are used for producing the product.

The acidified dairy product, e.g. a high protein yoghurt, may furthermore comprise one of more vitamin(s) and similar other ingredients such as vitamin A, vitamin D, vitamin E, vitamin K, thiamine, riboflavin, pyridoxine, vitamin B12, niacin, folic acid, pantothenic acid, biotin, vitamin C, choline, inositol, their salts, their derivatives, and combinations thereof.

The acidified dairy product, e.g. a high protein yoghurt, may furthermore comprise one of more stabilizer(s). Suitable stabilizers which can be used in the present invention include locust bean gum, guar gum, alginates, cellulose, xanthan gum, carboxymethyl cellulose, microcrystalline cellulose, carrageenans, pectins, inulin and mixtures thereof.

The content of the one of more stabiliser(s) may e.g. be in the range of 0.01-5% (w/w) relative to the dry weight of the product, preferably in the range of 0.1 to 0.5% (w/w).

The acidified dairy product, e.g. a high protein yoghurt, may furthermore comprise one of more emulsifier(s). Suitable emulsifiers to be used are mono- and di-glycerides, citric acid esters of mono- and di-glycerides, diacetyltartaric acid esters of mono- and di-glycerides polysorbate, lecithin or polyol esters of fatty acids such as propylene glycol monoester of fatty acids, as well as natural emulsifiers such as egg yolk, butter milk, raw acacia gum, rice bran extract or mixtures thereof.

The content of the one of more emulsifier(s) may be in the range of 0.01-3% (w/w) relative to the dry weight of the product, for example in the range of 0.1 to 0.5% (w/w).

In some preferred embodiments, the yoghurt is a stirred yoghurt containing:
a total amount of protein in the range of 9-18% (w/w),
the solids of the denatured whey protein composition in an amount of at least 3.5% (w/w), which denatured whey protein composition comprises at least 70% (w/w) protein on a dry weight basis relative to the weight of the denatured whey protein composition,
casein in an amount in the range of 30-65% (w/w) relative to the total amount of protein,
a total amount of fat of at most 2% (w/w)
a total amount of carbohydrate in the range of 2-20% (w/w), and
a total amount of CMP of at least 2% (w/w) relative to the total amount of protein.

In some preferred embodiments, the yoghurt is a stirred yoghurt containing:
a total amount of protein in the range of 9-18% (w/w),
the solids of the denatured whey protein composition in an amount of at least 3.5% (w/w), which denatured whey protein composition comprises at least 70% (w/w) protein on a dry weight basis relative to the weight of the denatured whey protein composition,
casein in an amount in the range of 30-65% (w/w) relative to the total amount of protein,
a total amount of fat of at most 0.3% (w/w)
a total amount of carbohydrate in the range of 2-20% (w/w), and
a total amount of CMP of at least 2% (w/w) relative to the total amount of protein.

In some preferred embodiments, the high protein yoghurt is a stirred yoghurt containing:
a total amount of protein in the range of 9-18% (w/w),
the solids of the denatured whey protein composition in an amount of at least 3.5% (w/w), which denatured whey protein composition comprises at least 70% (w/w) protein on a dry weight basis relative to the weight of the denatured whey protein composition, which denatured whey protein composition contains at most 2% lactose (w/w) on a dry weight basis,
casein in an amount in the range of 30-65% (w/w) relative to the total amount of protein,
a total amount of fat of at most 2% (w/w),
a total amount of lactose of at most 1% (w/w), preferably at most 0.4% (w/w), and
a total amount of CMP of at least 2% (w/w) relative to the total amount of protein.

In some preferred embodiments, the high protein yoghurt is a stirred yoghurt containing:
a total amount of protein in the range of 9-18% (w/w),
the solids of the denatured whey protein composition in an amount of at least 3.5% (w/w), which denatured whey protein composition comprises at least 70% (w/w) protein on a dry weight basis relative to the weight of the denatured whey protein composition, which denatured whey protein composition contains at most 2% lactose (w/w) on a dry weight basis and at most 0.3% fat on a dry weight basis,
casein in an amount in the range of 30-65% (w/w) relative to the total amount of protein,
a total amount of fat of at most 0.3% (w/w)
a total amount of lactose of at most 1% (w/w), preferably at most 0.4% (w/w), and
a total amount of CMP of at least 2% (w/w) relative to the total amount of protein.

In other preferred embodiments of the invention, the high protein yoghurt is a drinking yoghurt containing:
a total amount of protein in the range of 8-16% (w/w),
the solids of the denatured whey protein composition in the range of at least 6% (w/w), which denatured whey protein composition comprises at least 70% (w/w) protein on a dry weight basis relative to the weight of the denatured whey protein composition, casein in an amount in the range of 0-30% (w/w) relative to the total amount of protein, a total amount of fat of at most 2% (w/w), a total amount of carbohydrate in the range of 2-20% (w/w), and a total amount of CMP of at least 6% (w/w) relative to the total amount of protein.

In other preferred embodiments of the invention, the high protein yoghurt is a drinking yoghurt containing:

a total amount of protein in the range of 8-16% (w/w), the solids of the denatured whey protein composition in the range of at least 6% (w/w), which denatured whey protein composition comprises at least 70% (w/w) protein on a dry weight basis relative to the weight of the denatured whey protein composition, which denatured whey protein composition contains at most 0.3% fat (w/w) on a dry weight basis, casein in an amount in the range of 0-30% (w/w) relative to the total amount of protein, a total amount of fat of at most 0.4% (w/w), a total amount of carbohydrate in the range of 2-20% (w/w), and a total amount of CMP of at least 6% (w/w) relative to the total amount of protein.

In other preferred embodiments of the invention, the high protein yoghurt is a drinking yoghurt containing:

a total amount of protein in the range of 8-16% (w/w), the solids of the denatured whey protein composition in the range of at least 6% (w/w), which denatured whey protein composition comprises at least 70% (w/w) protein on a dry weight basis relative to the weight of the denatured whey protein composition, which denatured whey protein composition contains at most 0.3% fat (w/w) on a dry weight basis and at most 1% (w/w) lactose, preferably at most 0.4% (w/w) on a dry weight basis, casein in an amount in the range of 0-30% (w/w) relative to the total amount of protein, a total amount of fat of at most 0.4% (w/w), a total amount of lactose of at most 1% (w/w), preferably at most 0.4% (w/w), and a total amount of CMP of at least 6% (w/w) relative to the total amount of protein.

In other preferred embodiments of the invention, the high protein yoghurt is a drinking yoghurt containing:

a total amount of protein in the range of 8-16% (w/w), the solids of the denatured whey protein composition in the range of at least 6% (w/w), which denatured whey protein composition comprises at least 70% (w/w) protein on a dry weight basis relative to the weight of the denatured whey protein composition, which denatured whey protein composition contains at most 0.3% fat (w/w) on a dry weight basis and at most 1% (w/w) lactose, preferably at most 0.4% (w/w) on a dry weight basis, casein in an amount in the range of 0-30% (w/w) relative to the total amount of protein, a total amount of fat of at most 2% (w/w), a total amount of lactose of at most 1% (w/w), preferably at most 0.4% (w/w), and optionally, a total amount of CMP of at least 6% (w/w) relative to the total amount of protein.

Such high protein drinking yoghurts preferably have a viscosity in the range of 10-150 cP, and even more preferably in the range of 10-100 cP.

In some preferred embodiments of the invention, the high protein yoghurt contains a total amount of CMP of at least 5% (w/w) relative to the total amount of protein. For example, the high protein yoghurt may contain a total amount of CMP of at least 8% (w/w) relative to the total amount of protein. The high protein yoghurt may e.g. contain a total amount of CMP of at least 10% (w/w) relative to the total amount of protein. Alternatively, the high protein yoghurt may contain a total amount of CMP of at least 12% (w/w) relative to the total amount of protein.

Even higher amounts of CMP may be preferred, thus, the high protein yoghurt may contain a total amount of CMP of at least 14% (w/w) relative to the total amount of protein. For example, the high protein yoghurt may contain a total amount of CMP of at least 16% (w/w) relative to the total amount of protein. The high protein yoghurt may e.g. contain a total amount of CMP of at least 20% (w/w) relative to the total amount of protein. Alternatively, the high protein yoghurt may contain a total amount of CMP of at least 25% (w/w) relative to the total amount of protein.

In some embodiments of the invention the high protein yoghurt contains a total amount of CMP in the range of 2-40% (w/w) relative to the total amount of protein. For example, the high protein yoghurt may contain a total amount of CMP in the range of 5-35 (w/w) relative to the total amount of protein. The high protein yoghurt may e.g. contain a total amount of CMP in the range of 8-30% (w/w) relative to the total amount of protein. Alternatively, the high protein yoghurt may contain a total amount of CMP in the range of 10-25% (w/w) relative to the total amount of protein, such as e.g. 14-25% (w/w) relative to the total amount of protein.

Yet an aspect of the invention is a dairy product obtainable by the present method of producing an acidified dairy product.

In some preferred embodiments of the invention, the dairy product is a low fat dairy product meaning that the total amount of fat of the product is at most 10% (w/w). For example, the low fat dairy product may contain a total amount of fat of at most 5% (w/w).

Preferably, the low fat dairy product, e.g. a high protein yoghurt, may contain a total amount of fat of at most 2% (w/w). Even more preferably, the low fat dairy product, e.g. a high protein yoghurt, may contain a total amount of fat of at most 1% (w/w), such as e.g. a total amount of fat of at most 0.5% (w/w).

In some preferred embodiments of the invention, the dairy product, e.g. a high protein yoghurt, is a low lactose dairy product meaning that the total amount of lactose of the product is at most 2% (w/w). Thus, the low lactose dairy product, e.g. a high protein yoghurt, may contain a total amount of lactose of at most 1.5% (w/w). Preferably, the low lactose dairy product, e.g. a high protein yoghurt, may contain a total amount of lactose of at most 1% (w/w). Even more preferably, the low lactose dairy product, e.g. a high protein yoghurt, may contain a total amount of lactose of at most 0.5% (w/w). For example, the low lactose dairy product, e.g. a high protein yoghurt, may contain a total amount of lactose of at most 0.3% (w/w). The low lactose dairy product, e.g. a high protein yoghurt, may e.g. contain a total amount of lactose of at most 0.2% (w/w). Alternatively, the low lactose dairy product, e.g. a high protein yoghurt, may contain a total amount of lactose of at most 0.1% (w/w), such as e.g. substantially no lactose.

The low lactose variants of the dairy product, such as yoghurts, are particularly advantageous for persons suffering from lactose-intolerance.

Lactose may be removed enzymatically in which case it is converted to the monosaccharides glucose and galactose. Both monosaccharides contribute to the total carbohydrate content of the dairy product.

In some preferred embodiments of the invention, the dairy product, e.g. a high protein yoghurt, is a low carbohydrate dairy product meaning that the total amount of carbohydrate of the product is at most 2% (w/w). For example, the low carbohydrate dairy product, e.g. a high protein yoghurt, may contain a total amount of carbohydrate of at most 1.5% (w/w). Preferably, the low carbohydrate dairy product, e.g. a high protein yoghurt, may contain a total amount of carbohydrate of at most 1% (w/w). Even more preferably, the low carbohydrate dairy product, e.g. a high protein yoghurt, may contain a total amount of carbohydrate of at most 0.5% (w/w). For example, the low carbohydrate dairy product, e.g. a high protein yoghurt, may contain a total amount of carbohydrate of at most 0.3% (w/w). The low carbohydrate dairy product, e.g. a high protein yoghurt, may e.g. contain a total amount of carbohydrate of at most 0.2% (w/w). Alternatively, the low carbohydrate dairy product, e.g. a high protein yoghurt, may contain a total amount of carbohydrate of at most 0.1% (w/w), such as e.g. substantially no carbohydrate.

In some preferred embodiments of the invention, the high protein food product is a high protein, acidified beverage.

In the context of the present invention, the term "acidified beverage" relates to a dairy product having a pH of at most 5.5, and e.g. less, such as at most 5.0, or even at most 4.7, such as e.g. approx. pH 4.6. Even lower pH'es may be employed.

Typically, high protein, acidified beverages have been acidified with chemical acidulants and without the use of microorganisms.

In the context of the present invention, the term "chemical acidulants" relates to non-microbial agents that as such are acidic or that are converted to acids, e.g. by hydrolysis. Food acids are useful examples of non-microbial agents that are acidic as such.

The beverage may for example comprise a food acid selected from the group consisting of citric acid, malic acid, tartaric acid, acetic acid, benzoic acid, butyric acid, lactic acid, fumaric acid, succinic acid, ascorbic acid, adipic acid, phosphoric acid and mixtures thereof.

The total amount of food acid in the beverage may be at least 0.1% (w/w) of the total weight of the beverage, preferably 0.5% (w/w), for example in the range of 1.0-5%; more preferably at least 1.0% (w/w) of the total weight of the beverage. These total amounts of food acids in the beverage correspond to the sum of food acid, including both acids, partly deprotonated and fully deprotonated forms of the food acid.

Lactones such as e.g. Glucono Delta Lactone (GDL) are converted to acids by hydrolysis.

In some preferred embodiments of the invention, the high protein, acidified beverage contains substantially no casein, i.e. at most 0.5% (w/w) casein relative to the total weight of the beverage and preferably at most 0.1% (w/w).

In some preferred embodiments of the invention, the high protein, acidified beverage contains a total amount of CMP of at least 5% (w/w) relative to the total amount of protein. For example, the high protein, acidified dairy product may contain a total amount of CMP of at least 8% (w/w) relative to the total amount of protein. The high protein, acidified beverage may e.g. contain a total amount of CMP of at least 10% (w/w) relative to the total amount of protein. Alternatively, the high protein, acidified beverage may contain a total amount of CMP of at least 12% (w/w) relative to the total amount of protein.

Even higher amounts of CMP may be preferred, thus, the high protein, acidified beverage according to the invention may contain a total amount of CMP of at least 14% (w/w) relative to the total amount of protein. For example, the high protein, acidified beverage may contain a total amount of CMP of at least 16% (w/w) relative to the total amount of protein. The high protein, acidified beverage may e.g. contain a total amount of CMP of at least 20% (w/w) relative to the total amount of protein. Alternatively, the high protein, acidified beverage may contain a total amount of CMP of at least 25% (w/w) relative to the total amount of protein.

In some embodiments of the invention, the high protein, acidified beverage according to the invention contains a total amount of CMP in the range of 2-40% (w/w) relative to the total amount of protein. For example, the high protein, acidified beverage may contain a total amount of CMP in the range of 5-35 (w/w) relative to the total amount of protein. The high protein, acidified beverage may e.g. contain a total amount of CMP in the range of 8-30% (w/w) relative to the total amount of protein. Alternatively, the high protein, acidified beverage may contain a total amount of CMP in the range of 10-25% (w/w) relative to the total amount of protein, such as e.g. 14-25% (w/w) relative to the total amount of protein.

Another aspect of the invention pertains to a high protein beverage obtainable according to the method of producing a high protein beverage of the present invention.

The types and amounts of protein ingredients, fat, sweeteners, stabilisers and emulsifiers that are mentioned in the context of the high protein, acidified dairy products can also be used for high protein beverages in general.

The denatured whey protein composition and ingredients containing the denatured whey protein composition are also useful for preparing high protein, nutritional products, including nutritional beverages, and specialist nutritional products including meal replacement products.

Specialist nutritional products (sometimes known as medical foods and enteral foods) can be prepared for patients and the elderly and administered in liquid form. One of the challenges to overcome in the preparation of such foods is attaining sufficient calorie density.

In some preferred embodiments of the invention, the food product is a high protein, nutritional beverage having a calorie density of at least 0.1 kcal/mL, such as e.g. at least 1 kcal/mL or at least approx. 3 kcal/mL. Such beverages typically contain a significant amount of fat, e.g. at least 5% (w/w) fat relative to the total weight of the beverage, preferably at least 8% (w/w) fat, and even more preferably at least 10% (w/w) fat relative to the total weight of the beverage.

The high protein nutritional beverage may for example have a pH in the range of 6-8, such as approx. 7. Alternatively, the high protein nutritional beverage may be an acidified high protein beverage as described herein.

The protein nutritional beverages may have a total protein content in the same ranges as mentioned in the context of acidified high protein beverages.

The fat may e.g. comprise, or even consist of, one or more of the fat or oil types mentioned herein.

The denatured whey protein composition may e.g. be used as an ingredient in a mixture to form a nutritional product comprising the denatured whey protein composition, water and soluble carbohydrate, and preferably also comprising a significant amount of fat.

Preferably, the mixture further comprises sodium and potassium salts and a source of fats and vitamins. Preferably, the mixture is heated to a temperature above 70° C., preferably above 100° C., more preferably under at least commercial sterilising conditions. Preferably, the mixture also includes a magnesium salt. Commercial sterilising conditions are conditions achieved using the application of heat or high pressure to render a product free of microorganisms capable of growing in the product at non refrigerated conditions (over 10° C. at which the product will be held during distribution and storage).

The present inventors have found that the denatured whey protein compositions containing an amount of CMP of at least 10% (w/w), such as at least 17% (w/w), relative to the total amount of protein is particularly useful for heat-treated, high protein, oil-in-water emulsions of water and fat, e.g. the above high protein, nutritional beverage.

More specifically, the present inventors have seen indications that the use of the present denatured whey protein composition reduces the tendency to viscosity build-up and emulsion gel formation in heat-treated, high protein, oil-in-water emulsions of water and fat. This effect is clearly demonstrated in Example 6 and FIG. 2 and is believed to be particularly strong when a source of non-emulsified fat is used, such as e.g. vegetable fat, vegetable oil or milk fat.

In some preferred embodiments of the invention, the high protein, nutritional beverage has a calorie density of at least 1 kcal/mL, and comprises
- a total amount of protein of at least 4% (w/w),
- a total amount of fat of at least 8% (w/w),
- the solids of the denatured whey protein composition in an amount of at least 4% (w/w), which denatured whey protein composition contains an amount of CMP of at least 17% (w/w) relative to the total amount of protein of the composition.

For example, the high protein, nutritional beverage may have a calorie density of at least 1 kcal/mL, and comprise
- a total amount of protein of at least 8% (w/w),
- a total amount of fat of at least 8% (w/w),
- the solids of the denatured whey protein composition in an amount of at least 6% (w/w), which denatured whey protein composition contains an amount of CMP of at least 17% (w/w) relative to the total amount of protein of the composition.

It is particularly preferred that the denatured whey protein compositions in addition to a significant amount of CMP contains a total amount of soluble alpha-lactalbumin and beta-lactoglobulin of at most 15% (w/w) relative to the total amount of protein. For example, the denatured whey protein compositions may contain a total amount of soluble alpha-lactalbumin and beta-lactoglobulin of at most 10% (w/w) relative to the total amount of protein. The denatured whey protein compositions may e.g. contain a total amount of soluble alpha-lactalbumin and beta-lactoglobulin of at most 8% (w/w) relative to the total amount of protein. Alternatively, the denatured whey protein compositions may contain a total amount of soluble alpha-lactalbumin and beta-lactoglobulin of at most 6% (w/w) relative to the total amount of protein, such as at most 4% (w/w) or even at most 2% (w/w). For example, the denatured whey protein compositions may contain substantially no soluble alpha-lactalbumin and beta-lactoglobulin i.e. of at most 1% (w/w) relative to the total amount of protein and preferably 0% (w/w).

If the denatured whey protein composition does contain soluble alpha-lactalbumin and/or beta-lactoglobulin, the present inventors have seen indications that the weight ratio between CMP and the sum of soluble alpha-lactalbumin and soluble beta-lactoglobulin advantageously may be at least 1.0, preferably at least 1.5, such as at least 1.6, and even more preferably at least 1.8. The denatured whey protein composition may for example have a weight ratio between CMP and the sum of soluble alpha-lactalbumin and soluble beta-lactoglobulin of at least 2.0, such as at least 2.5, or even at least 3.0.

The denatured whey protein composition may e.g. have a weight ratio between CMP and the sum of soluble alpha-lactalbumin and soluble beta-lactoglobulin in the range of 1.5-10, for example in the range of 2.0-8, or e.g. in the range of 2.2-7.

The food product containing the denatured whey protein composition can be produced in a number of different ways. The denatured whey protein composition may for example be added as a dry ingredient during the production of the food product or it may be added in the form of a suspension during the production.

When the denatured whey protein composition is used in the form of powder, it is often preferred to re-suspend the denatured whey protein composition powder in an aqueous liquid, e.g. water or milk, and give it time to rehydrate, e.g. 10 minutes-1 hour, before continuing the processing. However, the general process may already inherently give the denatured whey protein composition powder sufficient time for rehydration in which case extra rehydration time is not necessary.

An aspect of the invention pertains to a method of producing a high protein acidified dairy product, such as e.g. a high protein yoghurt, the method comprising the steps of:
a) providing a dairy base comprising at least one dairy component and at least one carbohydrate,
b) pasteurising the dairy base at a temperature in the range of 70-150 degrees C. and subsequently cooling the dairy base,
c) contacting the heat-treated dairy base with an acidifying agent,
d) allowing the acidifying agent to reduce the pH of the dairy base to a pH of at most 5,
e) optionally, subjecting the acidified dairy base to one or more additional processing steps,
f) optionally, packaging the final acidified dairy product in a suitable container.
wherein:
  I) the dairy base provided in step a) comprises a total amount of protein of at least 7% (w/w), the solids of a denatured whey protein composition as defined herein in an amount of at least 2% (w/w), and a total amount of CMP of at least 2% (w/w) relative to the total amount of protein, or
  II) an ingredient comprising, or even consisting of, the solids of denatured whey protein composition is added to the dairy base between steps a) and f) in an amount sufficient to form the acidified dairy product containing:
    a total amount of protein of at least 7% (w/w),
    the solids of the denatured whey protein composition in an amount of at least 2% (w/w), and
    a total amount of CMP of at least 2% (w/w) relative to the total amount of protein.

The above method includes two variants; variant I) where all or substantially all of the ingredients are present in the dairy bases from the start, or variant II) where at least some of the denatured whey protein composition is added to the dairy bases after step a).

For example, the solids of denatured whey protein composition may be added between steps a) and b), during step b), between steps b) and c), during step c), between steps c) and d), during step d), between steps d) and e), during step e), and/or between steps e) and f).

It should be noted that the term "dairy base" describes the product stream during the method and that the dairy base may have different compositions during the method—especially following variant II), but also according to variant I) if sweetener(s) and/or flavour is added in step e).

Step a) involves the provision of the dairy base comprising at least one dairy component and at least one carbohydrate.

In some embodiments of the invention according to variant I), the dairy base of step a) contains all or substantially all protein ingredients that go into the final product, except for the protein contribution of the acidifying agent.

The dairy base of step a) may e.g. comprise a total amount of protein of at least 7% (w/w), solids of the denatured whey protein composition amount of at least 2% (w/w) and a total amount of CMP of at least 2% (w/w) relative to the total amount of protein.

In some preferred embodiments of the invention, the dairy base of step a) contains a total amount of CMP of at least 12% (w/w) relative to the total amount of protein. For example, the dairy base of step a) may contain a total amount of CMP of at least 14% (w/w) relative to the total amount of protein. The dairy base of step a) may e.g. contain a total amount of CMP of at least 16% (w/w) relative to the total amount of protein. Alternatively, the dairy base of step a) may contain a total amount of CMP of at least 18% (w/w) relative to the total amount of protein.

Solutions having a higher content of CMP may be preferred, thus, the dairy base of step a) may e.g. contain a total amount of CMP of at least 20% (w/w) relative to the total amount of protein. For example, the dairy base of step a) may contain a total amount of CMP of at least 22% (w/w) relative to the total amount of protein. The dairy base of step a) may e.g. contain a total amount of CMP of at least 25% (w/w) relative to the total amount of protein. Alternatively, the dairy base of step a) may contain a total amount of CMP of at least 28% (w/w) relative to the total amount of protein.

The dairy base of step a) may e.g. contain a total amount of CMP of in the range of 10-40% (w/w) relative to the total amount of protein. For example, the dairy base of step a) may contain a total amount of CMP in the range of 12-35% (w/w) relative to the total amount of protein. The dairy base of step a) may e.g. contain a total amount of CMP in the range of 14-30% (w/w) relative to the total amount of protein. Alternatively, the dairy base of step a) may contain a total amount of CMP in the range of 16-28% (w/w) relative to the total amount of protein.

The dairy base of step a) may e.g. contain a total amount of CMP in the range of 18-26% (w/w) relative to the total amount of protein. For example, the dairy base of step a) may contain a total amount of CMP in the range of 18-24% (w/w) relative to the total amount of protein.

In some embodiments of the invention according to variant I), the dairy base of step a) contains all the solids that will be present in the final acidified dairy product, except for the solids contribution of the acidifying agent.

Thus, the dairy base of step a) may have the composition of the high protein, acidified dairy products, e.g. yoghurts, described herein.

In other embodiments of the invention, the dairy base of step a) a carbohydrate, e.g. lactose, and some of the protein ingredients, but at least some of the solids of the denatured whey protein composition, such as e.g. all the solids of the denatured whey protein composition, is provided after step a), e.g. after the acidification of step d) or as one of the additional processing steps of step e).

In some embodiments of the invention, the dairy base of steps a) and b) only contains lactose and a sufficient amount of mineral nutrients to allow the bacterial acidification of the dairy base to take place. The remaining protein ingredients are added after the acidification of step d).

The dairy base of step a) may e.g. contain the types and amounts of protein ingredients, sweeteners, stabilisers, fats and minerals mentioned in the context of the high protein, acidified dairy product or the high protein yoghurt.

Step b) involves pasteurising the dairy base of step a) by heating it to a temperature of at least 70 degrees C., e.g. in the range of 70-150 degrees C., and maintaining the temperature of the dairy base in that range for a duration sufficient to kill a substantial number of the viable microorganisms of the dairy base. Typically, at least 99% of the microorganisms are killed during the pasteurisation. Another purpose of the pasteurisation may be to denature at least some of the native whey protein which may be present in the dairy base of step a).

The duration of the pasteurisation depends on the temperature(s) to which the dairy based is heated and is typically somewhere between 1 second and 30 minutes.

For example, the dairy base may be heated to one or more temperatures in the range of 70-85 degrees C. for 1-30 minutes. The dairy base may e.g. be heated to one or more temperatures in the range of 80-95 degrees C. for 0.5-15 minutes. Alternatively, the dairy base may be heated to one or more temperatures in the range of 90-110 degrees C. for 0.2-10 minutes. For example, the dairy base may be heated to one or more temperatures in the range of 100-150 degrees C. for 1 second-2 minutes.

After the heat-treatment the dairy base is cooled, e.g. to a temperature of at most 50 degrees C., preferably even lower, such as at most 45 degrees C. or at most 40 degrees C.

In addition to the pasteurisation, step b) typically contains a homogenisation step which may be place before or after the heat treatment.

The cooled dairy base of step b) is contacted with the acidifying agent.

The acidifying agent may for example be a bacterial culture, typically referred to as a starter culture, in which case the addition of the acidifying agent may be perceived as an inoculation of the dairy base, in which case one obtains an inoculated dairy base.

Thus, in some embodiments of the invention the acidifying agent comprises a chemical acidifying agent.

In the context of the present invention, the term "chemical acidifying agent" pertains to a chemical compound capable of gradual or instantaneous reduction of the pH of the mixture.

The chemical acidifying agent may for example be a food acceptable acid (also referred as a food acid) and/or a lactone. Examples of useful acids are carboxylic acids such as citric acid, tartaric acid and/or acetic acid. An example of a useful lactone is glucono delta-lactone (GDL).

In some embodiments of the invention, the chemical acidifying agent comprises one or more components selected from the group consisting of acetic acid, lactic acid, malic acid, citric acid, phosphoric acid or glucono delta-lactone.

The actual concentration of the chemical acidifying agent depends on the specific formulation of dairy base. It is generally preferred that the chemical acidifying agent is used in a sufficient amount to reduce the pH of the mixture to at most pH 5.5, and preferably at most pH 5.0, such as e.g. at most pH 4.6.

In some preferred embodiments of the invention, the acidifying agent comprises, or even is, a starter culture.

In principle, any type of starter culture traditionally used in making yoghurt-type high protein acidified dairy product may be used. Starter cultures used in the dairy industry are normally mixtures of lactic acid bacterial strains, but a single strain starter culture may also be useful in the present invention. Thus, in preferred embodiments, the one or more starter culture organism of the present process is a lactic acid bacterial species selected from the group consisting of *Lactobacillus, Leuconostoc, Lactococcus*, and *Streptococcus*. Commercial starter culture comprising one or more of these lactic acid bacterial species may be useful in the present invention.

In some preferred embodiments of the invention, the starter culture comprises one or more halotolerant bacterial culture(s).

The amount of the added acidifying agent is typically relatively low compared to the amount of the dairy base.

In some embodiments of the invention, the acidifying agent dilutes the dairy base by a factor of at most 1.05, preferably at most by a factor of 1.01, and even more preferably by a factor of at most 1.005.

Flavouring and/or aromatic agents may be added to the dairy base to obtain a flavoured acidified dairy product. Flavours may be added as solids, but are preferably added in the form of liquids.

During step d) the acidifying agent is allowed to reduce the pH of the dairy base of step c).

If the dairy base of step c) contains a starter culture, the dairy base, which is an inoculated dairy base, is incubated under conditions permitting the starter culture to become metabolically active to produce said acidified dairy product. In some preferred embodiments, the inoculated dairy base is incubated at a temperature between 32° C. and 43° C. until the desired pH is reached. The fermentation may be stopped by decreasing the temperature to around 10° C.

If the mixture contains a chemical acidifying agent, the chemical acidifying agent will normally start reducing the pH of the mixture as soon as the chemical acidifying agent forms part of the mixture. Some chemical acidifying agents, such as lactones and slowly dissolving acids, will provide a gradual pH reduction as they react with water or are dissolved.

The temperature of the dairy base during step d) is typically in the range of 20-50 degrees C., and preferably in the range of 32-45 degrees C.

The method of producing the acidified, high protein dairy product may contain one or more process steps in addition to steps a), b), c) and d). For example, one or more of such additional process steps may take place in step e) after the acidification of the dairy base.

Often, the acidified dairy base obtained in step d) is subsequently subjected to mechanical stirring and/or homogenisation, particularly if the acidification leads to the formation of strong gels. Thus, step e) may involve mechanical stirring and/or homogenisation of the acidified dairy base.

Moreover, if additional ingredients are required in the acidified, high protein dairy product, these may be added during step e) and mixed into the acidified dairy base.

Useful examples of such additional ingredients are sweeteners, flavouring agents, additional denatured whey protein composition, stabilisers, emulsifiers and vitamins. Examples of such additional ingredients are mentioned in the context of the composition of the high protein, acidified dairy product or the high protein yoghurt.

The packaging of step f) may involve any suitable packaging techniques, and any suitable container may be used for packaging the high protein, acidified dairy product.

The packaging of step f) may for example involve aseptic packaging, i.e. the product is packaged under aseptic conditions. For example, the aseptic packaging may be performed by using an aseptic filling system, and it preferably involves filling the product into one or more aseptic container(s).

Examples of useful containers are e.g. bottles, cartons, bricks and/or bags.

The packaging is preferably performed at or below room temperature. Thus, the temperature of the product is preferably at most 30 degrees C. during the packaging, preferably at most 25 degrees C., and even more preferably at most 20 degrees C., such as at most 10 degrees C.

The temperature of the product during packaging may for example be in the range of 2-30 degrees C., and preferably in the range of 5-25 degrees C.

The denatured whey protein composition of the invention is advantageously used as a component of a food ingredient powder.

Accordingly, one embodiment of the invention is a food ingredient powder comprising, or even consisting of:
  i. the solids of the denatured whey protein composition in an amount of at least 5% (w/w), wherein the denatured whey protein composition contains
     a total amount of protein of at least 60% (w/w) on a dry weight basis,
     a total amount of CMP of at least 10% (w/w) relative to the total amount of protein,
     insoluble whey protein particles having a particle size in the range of 1-10 micron, where the amount of said insoluble whey protein particles is in the range of 50-90% (w/w) relative to the total amount of protein
  ii. optionally, a small amount of water
  iii. one or more additional components selected from the group consisting of:
     a caseinate composition,
     a concentrate of micellar casein,
     a milk protein concentrate, and
     a milk powder, such as e.g. skimmed milk powder.

The solids of the denatured whey protein composition, meaning the material that would be left if all water of the composition was removed, may in some cases be present in higher amounts in the food ingredient powder. The solids present in the food ingredient powder may be present in an amount of at least 25% (w/w). For example, the solids present in the food ingredient powder may be present in amount of at least 40% (w/w); preferably, the solids are present in amount of at least 60% (w/w).

The denatured whey protein composition typically has a total amount of protein of at least 70% (w/w) on a dry-matter basis, preferably at least 75% (w/w), and even more preferably at least 80% (w/w) in a dry weight basis.

The denatured whey protein composition typically has a total amount of CMP of at least 12% (w/w) relative to the total amount of protein, preferably at least 14% (w/w), and even more preferably at least 16% (w/w).

In a preferred embodiment, the food ingredient powder has a total protein:ash content weight ratio of at least 15. In some cases, the total protein:ash content weight ratio of the food ingredient powder is at least 20. Even more preferably, the total protein:ash content weight ratio of the food ingredient powder is at least 30. For example, the total protein:ash content weight ratio of the food ingredient powder may be at least 40, such as at least 50, preferably at least 20, and even more preferably at least 30, such at least 40 or at least 50.

For example, the food ingredient powder may have a total protein:ash content weight ratio in the range of 15-60. The food ingredient powder may e.g. have a total protein:ash content weight ratio in the range of 20-55. Alternatively, the food ingredient powder may have a total protein:ash content weight ratio in the range of 25-50, such as in the range of 30-45.

In a preferred embodiment, the food ingredient powder has a water content of at most 6% (w/w), preferably at most 3% (w/w).

In a preferred embodiment, the food ingredient powder has a lactose content of at most 35% (w/w). Preferably, the food ingredient powder has a lactose content of at most 15% (w/w). For example, the food ingredient powder has a lactose content of at most 10% (w/w).

In one embodiment, the food ingredient powder has a low fat content of at most 8% (w/w). For example, the food ingredient powder may contain at most 4% fat (w/w). In some cases, the food ingredient powder contains at most 3% fat (w/w). Alternatively, the food ingredient powder may contain at most 2% fat (w/w).

In one embodiment, the food ingredient powder additionally comprises casein either in the form of a caseinate composition or a concentrate of micellar casein. In one embodiment, the food ingredient powder contains a total amount of casein in the range of 0-20% (w/w). In some cases the food ingredient powder contains a total amount of casein in the range of 6-18% (w/w); such as in the range of 10-16% (w/w). For example, the food ingredient powder may contain a total amount of casein in the range of 12-13% (w/w).

In one embodiment, the food ingredient powder additionally comprises one or more of a milk protein concentrate; and a milk powder, such as e.g. skimmed milk powder.

In some embodiments of the invention, it is particularly preferred that the food ingredient powder contains at total amount of soluble alpha-lactalbumin and beta-lactoglobulin of at most 15% (w/w) relative to the total amount of protein. For example, the food ingredient powder may contain at total amount of soluble alpha-lactalbumin and beta-lactoglobulin of at most 10% (w/w) relative to the total amount of protein. The food ingredient powder may e.g. contain at total amount of soluble alpha-lactalbumin and beta-lactoglobulin of at most 8% (w/w) relative to the total amount of protein. Alternatively, the food ingredient powder may contain at total amount of soluble alpha-lactalbumin and beta-lactoglobulin of at most 6% (w/w) relative to the total amount of protein, such as at most 4% (w/w) or even at most 2%. For example, the food ingredient powder may contain substantially no soluble alpha-lactalbumin and beta-lactoglobulin i.e. of at most 1% (w/w) relative to the total amount of protein and preferably 0% (w/w).

It should be noted that embodiments and features described in the context of one of the aspects of the present invention also apply to the other aspects of the invention.

All patent and non-patent references cited in the present application are hereby incorporated by reference in their entirety.

The invention will now be described in further details in the following non-limiting examples.

EXAMPLES

Example 1: Methods of Analysis

Example 1.1: Quantification of the Amount of Insoluble Particles

The amount of insoluble whey protein particles having a particles size in the range of 1-10 micron (effectively encompassing the size range 0.5-10.49 micron) of a denatured whey protein composition is determined using the following procedure:
1. Make a 5% (w/w in water) suspension of the sample to be tested.
2. Let the resulting suspension rehydrate for one hour with gentle agitation (stirring).
3. Homogenize the suspension at 100 bar.
4. Centrifuge a first portion of the suspension at 15000 g for 5 minutes.
5. Collect the resulting supernatant and analyse for total protein (true protein). The amount of total protein of the supernatant is referred to as "A".
6. Analyse a second portion of the suspension (not subjected to centrifugation) for total protein (true protein). The amount of total protein of the suspension is referred to as "B".
7. Subject a third portion of the suspension to particle size distribution analysis by static light scattering and determine the percentage by volume of the particles that has a particle size >10 micron, this percentage is referred to "C".
8. Determine the amount (% w/w relative to total protein) of insoluble whey protein particles having a particle size the range of 1-10 micron as:

$$P_{1-10}=(((B-A)/B)*100\%)-C$$

9. Repeat steps 4-5, but centrifuging at 3000 g for 5 minutes instead of 15000 g (only the largest part of the particles will be removed). The total protein of the supernatant of step 9 is referred to as "D".
10. Determine the amount (% w/w relative to total protein) of insoluble whey protein particles having a particle size in the range of 0.5-1.5 micron as:

$$P_1=((D-A)/B)*100\%$$

The procedure is performed at approx. 15 degrees C. using a refrigerated centrifuge 3-30K from SIGMA Laborzentrifugen GmbH and 85 mL tubes (Order no. 15076), in which the 5% suspension is filled so that the total weight of tube and sample amounts to 96 g.

Particle size distribution analysis is performed using a Malvern Mastersizer (Micro Particle Sizer, Malvern Instruments Ltd., Worcestershire, UK).

Parameters: Particle refractive index 1.52 (real part), 0.1 (imaginary part) and dispersant refractive index 1.33 were used.

Data analysis: The data was fitted using the Mie scattering model (residuals <2%).

Example 1.2: Determination of Soluble CMP, Alpha-Lactalbumin and Beta-Lactobulin The content of soluble CMP, alpha-lactalbumin and beta-lactobulin was analyzed by size exclusion high performance liquid chromatography (SE-HPLC). A Waters 600 E Multisolvent Delivery System, a Waters 700 Satellite Wisp Injector and a Waters H90 Programmable Multiwavelength Detector (Waters, Milford, Mass., USA) were used. The elution buffer was composed of 0.15 M Na2S04, 0.09 M KH2P04 and 0.01 M K2HP04. The flow rate was 0.8 mL min-1 and the temperature 20° C.

Twenty-four hours prior to analysis, suspensions of the denatured whey protein compositions were prepared by using a sodium phosphate buffer (0.02 M) to obtain a final protein content of 0.1% (w/v). In addition, standard solutions of alpha-lactalbumin (Sigma-Aldrich Chemie GmbH, Steinheim, Germany) and beta-lactoglobulin (Sigma-Aldrich Chemie GmbH), and caseinomacropeptide at a concentration of 1 mg mL-1 were prepared. Prior to injection, the solutions were stirred and filtered (0.22 micron). A 25 microL sample was injected. The absorbance was recorded at 210 and 280 nm. For all the samples denatured whey protein compositions and the standards, the total protein content was determined according to Example 1.4.

Quantitative determination of the contents of native alpha-lactalbumin, beta-lactoglobulin and caseinomacropeptide was performed by comparing the peak areas obtained for the corresponding standard proteins with those of the samples.

Example 1.3: Determination of Viscosity

The viscosity of liquid products was measured on a rheometer (Haake rheostress) with a bob/cup system.

The measurement was performed at 5 degrees C. (both the temperature of the liquid sample and the relevant parts of the rheometer had a temperature of 5 degrees C.).

Procedure:
1. Sample Preparation

Each sample is filled into bottles during processing and placed in the laboratory cooler (5° C.) to temperate for 1 day.
2. Setup Set up the program for measurement of the product on the Haake rheostress, see method setup.

Install the bob/cup system. Check that the temperature of the water bath for HAAKE rheostress is set at 1° C., if not adjust the temperature.
3. Measuring Only the sample that is to be analysed is removed from the cool storage, the sample bottle is gently turned upside down 3 times to homogenise the sample if it is phase separated during storage. Add 40 ml sample to the cup and start the data-sampling programme. A double repetition is made.
4. Cleaning When the analysis is finished, dismantle the bob/cup system and clean it with water and soap and afterwards with cold water to temperate the system before the next measurement. Wipe the bob/cup system and install it again for the next sample.

Results:

The viscosity is presented in the unit centipoise (cP). Based on the cP-value read after 90 sec. (t(seq)), an average of the double repetition is calculated. The higher the measured cP values are, the higher the viscosity.

Materials:

For this procedure the following is required:
Haake rheostress 1 rheometer
Bob: Z34 DIN 53019 series
Cup: Z34 DIN53018 series probes
Water bath Haake K20/Haake DC50
Method setup:
The parameters for the programme were as follows:
Step 1: Measurement position
Step 2: Controlled Stress of 1.00 Pa for 30 sec. at 5.00° C. Frequency of 1.000 Hz. 2 data points are collected
Step 3: Controlled Rate of 50.00 I/s for 120 sec. at 5.00° C. 30 data points are collected
Step 4: Lift apart Example 1.4: Determination of Total Protein The total protein content (true protein) of a sample is determined by:
1) Determining the total nitrogen of the sample following ISO 8968-1/2|IDF 020-1/2-Milk—Determination of nitrogen content—Part 1/2: Determination of nitrogen content using the Kjeldahl method.
2) Determining the non-protein nitrogen of the sample following ISO 8968-4|IDF 020-4-Milk—Determination of nitrogen content—Part 4: Determination of non-protein-nitrogen content.
3) Calculating the total amount protein as $(m_{total\ nitrogen} - m_{non-protein-nitrogen})*6.38$.

Example 1.5: Determination of the Water Content of a Powder

The water content of a food product is determined according to ISO 5537:2004 (Dried milk—Determination of moisture content (Reference method)). NMKL is an abbreviation for "Nordisk Metodikkomité for Næringsmidler".

Example 1.6: Determination of Ash Content

The ash content of a food product is determined according to NMKL 173:2005 "Ash, gravimetric determination in foods".

Example 1.7: Determination of the Dry Weight of a Solution

The dry weight of a solution may be determined according NMKL 110 $2^{nd}$ Edition, 2005 (Total solids (Water)—Gravimetric determination in milk and milk products). NMKL is an abbreviation for "Nordisk Metodikkomité for Næringsmidler".

The water content of the solution can be calculated as 100% minus the relative amount of dry-matter (% w/w).

Example 18: Determination of the Total Amount of Lactose

The total amount of lactose is determined according to ISO 5765-2:2002 (IDF 79-2: 2002) "Dried milk, dried ice-mixes and processed cheese—Determination of lactose content—Part 2: Enzymatic method utilizing the galactose moiety of the lactose".

Example 1.9: Determination of the Degree of Denaturation

The denaturation degree of the proteins of the denatured whey protein compositions was analyzed by size exclusion high performance liquid chromatography (SE-HPLC). A Waters 600 E Multisolvent Delivery System, a Waters 700 Satellite Wisp Injector, and a Waters H90 Programmable Multiwavelength Detector (Waters, Milford, Mass., USA) were used. The elution buffer was composed of 0.15 M Na2S04, 0.09 M KH2P04 and 0.01 M K2HP04. The flow rate was 0.8 mL min-1 and the temperature 20° C. Twenty-four hours prior to analysis, suspensions of the denatured whey protein compositions were prepared by using a sodium phosphate buffer (0.02 M) to obtain a final protein content of 0.1% (w/v). In addition, standard solutions of alpha-lactalbumin (Sigma-Aldrich Chemie GmbH, Steinheim, Germany) and beta-lactoglobulin (Sigma-Aldrich Chemie GmbH), and caseinomacropeptide at a concentration of 1 mg mL-1 were prepared. Prior to injection, the solutions were stirred and filtered (0.22 micron). A 25 microL sample was injected. The absorbance was recorded at 210 and 280 nm. For all the samples denatured whey protein compositions and the standards, the total protein content was determined according to Example 1.4

A quantitative analysis of the native whey protein content was performed by comparing the peak areas obtained for the corresponding standard proteins with those of the samples. Afterwards, the denatured whey protein content of the denatured whey protein compositions were calculated by considering the total protein content of the samples and their quantified native protein. The degree of denaturation was calculated as $(w_{total\ protein} - w_{soluable\ protein}) / w_{total\ protein} * 100\%$, wherein $w_{total\ protein}$ is the weight of total protein and $w_{soluable\ protein}$ is the weight of soluble protein.

Example 2: Production of a High Protein Denatured Whey Protein Composition

A denatured whey protein composition was prepared using the following method:

Solution:

An aqueous solution containing sweet whey protein concentrate was prepared by dissolving the whey protein concentrate in water to obtain a dry-matter content of 16% and adjusting the pH to 6.4.

Denaturation and Microparticulation:

Denaturation and microparticulation was performed in a 6+6 Scraped Surface Heat Exchanger (SSHE), APV Shear Agglomerator, from APV/SPX, Denmark.

After passage through a holding cell (60 sec) the product was cooled down in a SSHE followed by a plate heat-exchanger (PHE) to 10° C.

During the heat-treatment (80 degrees C. for a duration of 10 minutes) the protein was denaturated and particles in the size 0.5-10 micron were formed.

The product suspension was pumped to a storage tank, and some of it was subsequently dried to a powder by means of spray-drying.

The aqueous whey protein solution and the suspension obtained from the heat denaturation/microparticulation were subsequently characterised with respect to content of native dry-matter, total protein, total fat, total lactose, ash content, content of native beta-lactoglobulin, content of native alpha-lactalbumin, content of native CMP, degree of microparticulation, particle size and pH.

Results

The results of the characterisation of the solution of sweet WPC and the suspension of denatured, microparticulated whey protein are presented in Table 1. As can be seen, significant amounts of native beta-lactoglobulin and alpha-lactalbumin of the solution has been denatured (approx. 88% beta-lactoglobulin and approx. 69% alpha-lactalbumin), whereas the level of CMP seems to be nearly the same in the suspension and in the solution.

TABLE 1

Comparison of the composition of the WPC solution and the product suspension.

|  | Solution of sweet WPC | Product suspension |
|---|---|---|
| % Dry matter | Approx. 16 | Approx. 16 |
| % Total protein | 13.0 | 13.0 |
| % Fat | 0.90 | 0.90 |
| % Lactose | 0.45 | 0.45 |
| % Ash | 0.55 | 0.55 |
| % Native beta-lactoglobulin relative to total protein | 55.0 | 6.5 |
| % Native alpha-lactalbumin relative to total protein | 18.0 | 5.5 |
| % native CMP of total protein** | 13.5 | 13.5 |
| Particle degree* | <10 | Approx. 67 |
| Particle size | 0.1-1 micron | 0.5-10 micron |
| pH | 6.4 | 6.4 |

*Content of insoluble whey protein particles in the size range 0.5-10 micron (% w/w total protein)

The non-protein-nitrogen content of the product suspension was 0.15% (w/w).

The spray-dried denatured whey protein composition had a solid content of dry-matter content of approx. 95%.

Example 3: Production of a Low Casein, High Protein Drinking Yoghurt Model for Testing the Impact of CMP Variations Five different samples of low casein, high protein drinking yoghurt model system were produced to assess how the CMP concentration of a high protein drinking yoghurt impacts the textural and sensory properties of the final product.

Ingredients

The ingredients used in the five samples and the resulting nutrient content are presented in Tables 2 and 3.

Denatured whey protein compositions containing varying amounts of CMP were prepared by mixing a denatured whey protein composition (Source B) based on acid whey with varying amounts of highly purified CMP (Source A).

Source A is a whey protein isolate powder having a total protein content of 82% (w/w) and containing CMP in an amount of 98% (w/w) relative to the total amount of protein.

Source B is a denatured, microparticulated whey protein powder based on acid whey (substantially free of CMP) produced according to Example 1 and having a total protein content of 82% (w/w) (Source B).

TABLE 2

Recipes for testing the effect of CMP in high-protein drinking yoghurt

|  | Samples | | | | |
|---|---|---|---|---|---|
|  | 1 | 2 | 3 | 4 | 5 |
| Source A % (w/w) | — | 0.55 | 1.10 | 1.83 | 2.75 |
| Source B % (w/w) | 9.10 | 8.54 | 7.99 | 7.26 | 6.35 |
| Cream, 38% fat % (w/w) | 3.00 | 3.00 | 3.00 | 3.00 | 3.00 |
| Lactose % (w/w) | 4.10 | 4.10 | 4.10 | 4.10 | 4.10 |
| Water % (w/w) | 83.80 | 83.80 | 83.80 | 83.80 | 83.80 |

TABLE 3

Calculation of the content of selected nutrients in the high-protein, low casein, drinking yoghurt samples

| | Samples | | | | |
|---|---|---|---|---|---|
| | 1 | 2 | 3 | 4 | 5 |
| Protein % (w/w) | 7.46 | 7.55 | 7.63 | 7.75 | 7.90 |
| Soluble CMP % (w/w) relative to total protein | 0 | 7.8 | 13.5 | 21.2 | 30.8 |
| Fat % (w/w) | 1.1 | 1.1 | 1.1 | 1.1 | 1.1 |
| Carbohydrate % (w/w) | 4.1 | 4.1 | 4.1 | 4.1 | 4.1 |

The solid content of the drinking yoghurt models were approx. 14% (w/w). The cream was the only source of casein which was present in an amount of approx. 0.8% (w/w) relative to the total amount of protein.

Process

The following process was used to prepare high-protein drinking yoghurts.

All dry ingredients were thoroughly mixed in the liquids using a motorized mixer and the resulting mixture was allowed to hydrate for 1 hour. The mixture was then preheated to 65° C. with a plate heat-exchanger and subsequently homogenised at 150 bar. The homogenized mixture was then pasteurised at 80° C. for 5 minutes and then allowed to cool to 42° C. 0.02% of the culture YC-183 from Chr. Hansen was added to the yoghurt mixture and allowed to incubate until the mixture reached a pH of below 4.6.

The acidified mixture was then smoothed by homogenisation at 180 bar and finally cooled. The final product was stored at 5° C.

Characterisation

The samples were characterised by sensory testing and by measuring their viscosity and degree of syneresis 2 days after product.

The drinking yoghurt samples having the highest content of CMP also had the lowest viscosity (see FIG. 1). There seems to be a significant shift in viscosity going from around 8% CMP to 13% CMP. The inventors did not see any signs of syneresis or sedimentation 2 days after production of the drinking yoghurts.

The products had an acceptable mouthfeel and no detectable off-tastes.

Conclusion

The present example demonstrates that increasing levels of CMP in the yoghurt milk and in the final high protein yoghurt decrease the viscosity of high protein yoghurts, and a significant drop in viscosity seems to take place around 10% (w/w) CMP relative to the total amount of protein.

The example also demonstrates that the high level of CMP may be provided by a denatured whey protein composition containing at least 10% (w/w) CMP relative to the total amount of protein.

Example 4: Production of High Protein Stirred Yoghurt

A high protein, casein-containing, stirred yoghurt was produced with the following ingredients:

| Ingredient | Content % (w/w) |
|---|---|
| Denatured whey protein powder of Example 2 (total protein: 82%) | 3.80 |
| WPC80 | 1.89 |
| Na-Caseinate | 2.21 |
| WPC35 | 0.57 |
| Whey permeate | 2.13 |
| Skimmed milk | 89.40 |

Nutritional Composition:

| Component | Content % (w/w) |
|---|---|
| Protein | 10.05 |
| Fat | 0.44 |
| Carbohydrates | 6.51 |
| Total solids | 18.38 |
| Whey protein part in recipe | 54.99 |
| Casein part in recipe | 45.01 |

Process

The powders were mixed with the liquid ingredients and allowed to hydrate for 1 hour at 5° C. Subsequently, the resulting suspension was preheated to 65° C. and homogenized in two steps (first at 200 bar and subsequently at 50 bar). After the pasteurisation, the suspension was pasteurised at 90° C. for 5 min, cooled and incubated with 0.02% lactic acid starter culture (YC-183 from Chr. Hansen) and allowed to incubate at 42° C. until the pH reached pH 4.5. The incubated product was subjected to smoothing at 9 bar using back pressure, mixed with the strawberry fruit composition and finally cooled and stored at 5 degrees C.

Evaluation

The high protein stirred yoghurt was subjected to sensory evaluation and was compared to a stirred yoghurt product containing only 7% (w/w) protein but containing a comparable amount of a lower grade, denatured whey protein powder (45% w/w protein).

The present high protein yoghurt was found to be a nice, spoonable product, which despite its higher protein content, had a lower degree of dryness and a more milky taste than the yoghurt containing the lower-grade denatured whey protein powder.

The viscosity of the present stirred yoghurt was determined to 2265 cP.

Example 5: Production of High Protein Drinking Yoghurt

A high protein, casein-containing drinking yoghurt was produced with the following ingredients:

| Ingredient | Content % (w/w) |
|---|---|
| Denatured whey protein powder of Example 2 (total protein: 82%) | 7.05 |
| WPC80 | 1.59 |
| Sucrose | 5.00 |
| Cream, 38% fat | 3.10 |
| Skimmed milk | 83.26 |

| Component | Content % (w/w) |
|---|---|
| Protein | 10.00 |
| Fat | 1.79 |
| Carbohydrates | 9.39 |
| Total solids | 22.28 |
| Whey protein part in recipe | 76.18 |
| Casein part in recipe | 23.82 |

Process

The powders were mixed with the liquid ingredients and allowed to hydrate for 1 hour at 5° C. Subsequently, the resulting suspension was preheated to 65° C. and homogenized in two steps (first at 200 bar and subsequently at 50 bar). After the pasteurisation, the suspension was pasteurised at 90° C. for 5 min, cooled and incubated with 0.02% lactic acid starter culture (YC-183 from Chr. Hansen) and allowed to incubate at 42° C. until the pH reached pH 4.5. The incubated product was subjected to smoothing at 9 bar using back pressure and finally cooled and stored at 5 degrees C.

Evaluation

The high protein drinking yoghurt was subjected to sensory evaluation and was compared to a drinking yoghurt product containing only 7% (w/w) protein but containing a comparable amount of a lower grade, denatured whey protein powder (45% w/w protein).

The present high protein drinking yoghurt was found to be an easily drinkable product, which despite its higher protein content, had a lower degree of dryness and a more milky taste than the yoghurt containing the lower-grade denatured whey protein powder. The observation of lower degree of dryness and less off-taste is identical to the observation done in the previous Example relating to high protein stirred yoghurts.

The viscosity of the present high protein drinking yoghurt was determined to only 50 cP, which is surprisingly low for a high protein drinking yoghurt containing 10% (w/w) total protein and which has both a good mouthfeel and a low level of dryness.

Example 6: Production of a High Fat, High Protein pH Neutral Beverage

Four different samples of a high fat, high protein beverage system were produced to assess how the CMP concentration of high fat, high protein beverage affects the textural and sensory properties of the final product.

Ingredients

The ingredients used in the samples and the composition of some of the nutrients are presented in Table 4.

TABLE 4

Ingredients of the four high fat, high protein beverage samples and their composition with respect to total fat, total protein and main soluble proteins.

| | High fat, high protein beverage samples | | | |
|---|---|---|---|---|
| | 1 | 2 | 3 | 4 |
| Source A (kg) | — | 0.025 | 0.051 | 0.086 |
| Source C (kg) | 3.77 | 3.64 | 3.50 | 3.32 |
| Milk fat (AMF) (kg) | 0.425 | 0.427 | 0.434 | 0.438 |
| Extra water (kg) | 0.758 | 0.864 | 0.975 | 1.12 |
| % Total protein (w/w) | 11.5 | 11.6 | 11.7 | 11.8 |

TABLE 4-continued

Ingredients of the four high fat, high protein beverage samples and their composition with respect to total fat, total protein and main soluble proteins.

| | High fat, high protein beverage samples | | | |
|---|---|---|---|---|
| | 1 | 2 | 3 | 4 |
| % Total fat (w/w) | 10 | 10 | 10 | 10 |
| % Soluble alpha-lactalbumin (w/w total protein) | 5.0 | 4.8 | 4.6 | 4.4 |
| % Soluble beta-lactoglobulin (w/w total protein) | 5.0 | 4.8 | 4.6 | 4.4 |
| % Soluble CMP (w/w total protein) | 15 | 17.9 | 21 | 25.1 |

Source A is a whey protein isolate powder having a total protein content of 82% (w/w) and containing CMP in an amount of 98% (w/w) relative to the total amount of protein.

Source C is a suspension of denatured, microparticulated whey protein based on sweet whey protein concentrate (comprising 15% CMP relative to the total amount of protein) produced according to Example 1 and having a total protein content of 82% (w/w solids). Source C has a total solids content of 19% (w/w).

Process

The following process was used to prepare high fat, high-protein beverage samples.

All ingredients were thoroughly mixed using a motorized mixer and the resulting mixture was allowed to hydrate for 1 hour at 10 degrees C. The mixture was then preheated to 60° C. with a plate heat-exchanger and subsequently homogenised in two stages at 150 bar followed by 30 bar.

Characterisation

In order to assess the development of viscosity in the beverage samples during a standard heating treatment of 90 degrees C. for 6 minutes, test samples of the four beverage samples were preheated to 65 degrees C. and then loaded into a rheometer (Anton Paar—model MCR301, Bob-cup model cc27), in which the cup (CC27-SS) is preheated to 90 degrees C. The rheometer is programmed as follows:

step 1: 30 seconds at 90 degrees C., shear: 50 1/s
step 2: 420 seconds at 90 degrees C., shear: 500 1/s After treatment in the rheometer, the sample is transferred to a black weighing boat and a photo of the sample is taken.

Figure 2:
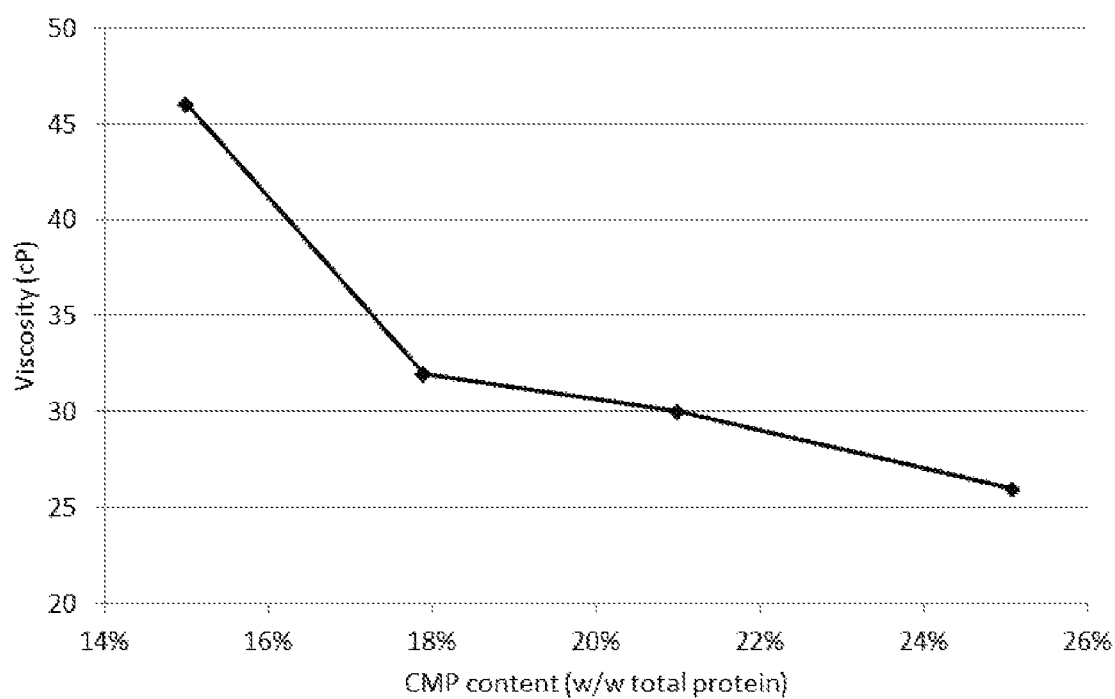
FIG. 2 shows the viscosity of heat-treated high fat, high protein beverages as a function of the CMP-content in the beverages.

The resulting viscosities are presented in FIG. 2 and clearly show a surprising 30% reduction in viscosity (a change from 46 cP to 32 cP) just from increasing the total amount of CMP from 15% (w/w total protein) to 17.9% (w/w total protein). Furthermore, the trend of reduced viscosity continues with increased CMP.

Conclusion

The present example demonstrates that increasing levels of CMP in the high fat, high protein beverages decrease the viscosity of high protein yoghurts, and a significant drop in viscosity (approx. 30%) takes place between 15% and 18% (w/w) CMP. The same tendency was observed in high protein drinking yoghurt system of Example 3, but the effect of an increased CMP content is even stronger in the high fat, high protein beverage.

The inventors have furthermore performed preliminary tests with a similar high fat beverage having a total protein content of 16%. Again, it was seen that an increase in the content of CMP led to a significant reduction of the viscosity of the high fat, high protein beverage. This indicates that CMP plays a role in preventing viscosity build-up in the liquids having a very high protein content.

The invention claimed is:

1. A denatured whey protein composition containing:
   a total amount of protein of at least 70% (w/w) on a dry weight basis,
   a total amount of CMP of at least 16% (w/w) relative to the total amount of protein,
   insoluble whey protein particles having a particle size in the range of 1-10 microns, where the amount of said insoluble whey protein particles is in the range of 50-84% (w/w) relative to the total amount of protein.

2. The denatured whey protein composition according to claim 1, wherein the denatured whey protein composition is:
   a powder, or
   an aqueous suspension.

3. The denatured whey protein composition according to claim 1, wherein the total protein:ash content weight ratio is at least 15.

4. The denatured whey protein composition according to claim 1, having a weight ratio between CMP and the sum of soluble alpha-lactalbumin and soluble beta-lactoglobulin of at least 1.0.

5. A method of producing a denatured whey protein composition according to claim 1, the method comprising the steps of
   a) providing a solution comprising whey protein, said solution having a pH in the range of 5-8, said solution comprising:
      water,
      a total amount of protein of at least 70% (w/w) on a dry weight basis,
      a total amount of CMP of at least 16% (w/w) relative to the total amount of protein,
   b) heating said solution to a temperature in the range of 70-160 degrees C. and keeping the temperature of the solution within this range for sufficient time to form insoluble whey protein micro particles having a particle size in the range of 1-10 micron,
   c) optionally, cooling the heat-treated solution,
   d) optionally, converting the heat-treated solution to a powder,
   wherein at least step b) involves subjecting the solution to mechanical shear.

6. A high protein food product comprising:
   a total amount of protein of at least 4% (w/w),
   the solids of a denatured whey protein composition according to claim 1 in an amount of at least 2% (w/w)
   a total amount of CMP of at least 2% (w/w) relative to the total amount of protein.

7. A high protein, acidified dairy product containing:
   a total amount of protein of at least 7% (w/w),
   the solids of a denatured whey protein composition according to claim 1 in an amount of at least 2% (w/w),
   a total amount of CMP of at least 2% (w/w) relative to the total amount of protein.

8. The high protein, acidified dairy product according to claim 7, having a total amount of protein of at least 10% (w/w).

9. The high protein, acidified dairy product according to claim 7, having a total amount of CMP of at least 5% (w/w) relative to the total amount of protein.

10. The high protein, acidified dairy product according to claim 7, which is a stirred yogurt.

11. The high protein, acidified dairy product according to claim 10 having a viscosity of at most 2500 cP.

12. The high protein, acidified dairy product according to claim 7, which is a drinking yogurt.

13. The high protein, acidified dairy product according to claim 12 having a viscosity in the range of 15-200 cP.

14. A method of producing a high protein, acidified dairy product according to claim 7, the method comprising the steps of:
    a) providing a dairy base comprising at least one dairy component and at least one carbohydrate,
    b) pasteurizing the dairy base at a temperature in the range of 70-150 degrees C. and subsequently cooling the dairy base,
    c) contacting the heat-treated dairy base with an acidifying agent,
    d) allowing the acidifying agent to reduce the pH of the dairy base to a pH of at most 5,
    e) optionally, subjecting the acidified dairy base to one or more additional processing steps,
    f) optionally, packaging the acidified dairy product in a suitable container,
    wherein:
    I) the dairy base provided in step a) comprises a total amount of protein of at least 7% (w/w), the solids of a denatured whey protein composition in an amount of at least 2% (w/w), and a total amount of CMP of at least 2% (w/w) relative to the total amount of protein, or
    II) an ingredient comprising the solids of denatured whey protein composition is added to the dairy base between steps a) and f) in an amount sufficient to form the acidified dairy product containing:
    a total amount of protein of at least 7% (w/w),
    the solids of the denatured whey protein composition according in an amount of at least 2% (w/w), and
    a total amount of CMP of at least 2% (w/w) relative to the total amount of protein.

15. The method according to claim 14, wherein the solids of a denatured whey protein composition are added between steps a) and b), during step b), between steps b) and c), during step c), between steps c) and d), during step d), between steps d) and e), during step e) and/or between steps e) and f).

16. The method according to claim 14, wherein the dairy base provided in step a) contains a total amount of CMP of at least 5% (w/w) relative to the total amount of protein.

17. A food ingredient powder comprising:
    i. the solids of the denatured whey protein composition according to claim 1 in an amount of at least 5% (w/w),
    ii. optionally, a small amount of water
    iii. one or more additional components selected from the group consisting of:
       a caseinate composition,
       a concentrate of micellar casein,
       a milk protein concentrate, and
       a milk powder.

18. The food ingredient powder of claim 17, wherein the solids of the denatured whey protein composition are in an amount of at least 25% (w/w).

19. The food ingredient powder of claim 17, wherein the food ingredient powder has a total protein:ash content weight ratio of at least 15.

20. The food ingredient powder of claim 17, wherein the food ingredient powder has a lactose content of at most 35% (w/w).

21. The food ingredient powder of claim 17, wherein the food ingredient powder has a fat content of at most 8% (w/w).

22. The denatured whey protein composition according to claim 1, wherein the composition further contains:

i. insoluble whey protein particles having a particle size of more than 10 microns in an amount of at most 10% (w/w) relative to the total amount of protein;
ii. insoluble whey protein particles having a particle size of less than 0.5 microns in an amount of at most 10% (w/w) relative to the total amount of protein; or
iii. insoluble whey protein particles having a particle size of more than 10 microns in an amount of at most 10% (w/w) relative to the total amount of protein and insoluble whey protein particles having a particle size of less than 0.5 microns in an amount of at most 10% (w/w) relative to the total amount of protein.

* * * * *